(12) United States Patent
Matsushima

(10) Patent No.: US 6,424,603 B1
(45) Date of Patent: Jul. 23, 2002

(54) LIBRARY APPARATUS OF STORAGE MEDIA

(75) Inventor: Takaaki Matsushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/575,083

(22) Filed: May 19, 2000

(30) Foreign Application Priority Data

May 21, 1999 (JP) .......................................... 11-141295

(51) Int. Cl.7 .............................................. G11B 17/26
(52) U.S. Cl. ............................. 369/30.42; 369/30.69; 369/30.7; 360/92
(58) Field of Search ................................ 369/30.7, 191, 369/192, 30.42, 30.69, 30.68; 360/92, 98.04

(56) References Cited

U.S. PATENT DOCUMENTS

| | | | |
|---|---|---|---|
| 3,526,406 A | * 9/1970 | Blackie et al. | 360/92 |
| 5,034,935 A | * 7/1991 | Ishibashi et al. | 369/36 |
| 5,101,388 A | 3/1992 | Fushimi | 369/36 |
| 5,255,251 A | * 10/1993 | Fitzgerald et al. | 369/36 |
| 5,940,354 A | * 8/1999 | Inoue | 369/35 |

FOREIGN PATENT DOCUMENTS

DE      3607 586 A1     10/1986

* cited by examiner

Primary Examiner—Brian E. Miller
(74) Attorney, Agent, or Firm—Scully, Scott, Murphy & Presser

(57) ABSTRACT

A library apparatus can reduce number of motors to be incorporated and can reduce number of parts for simplification of construction for contributing to down-sizing of the apparatus and reducing a cost. The library apparatus of a storage media reads and/or writes information from and in a storage medium housed in a cartridge by withdrawing a desired one of a plurality of cartridges housed within a magazine which is loaded in an apparatus body, by cartridge loading and unloading means and loading the withdrawn cartridge in medium drive means. The cartridge loading and unloading means performs loading and unloading of the magazine to the apparatus body.

3 Claims, 36 Drawing Sheets

LIBRARY APPARATUS OF STORAGE MEDIA

BACKGROUND OF THE INVENTION

1. Field of the Invention

The present invention relates generally to a library apparatus of storage media, in which a magazine housing a plurality of cartridges, each receiving a storage medium, is loaded, and a desired one of the storage media received within the magazine is accessed for reading information from the storage medium, writing information in the storage medium, and performing both of reading and writing information. More particularly, the invention relates to an improvement in a loading mechanism for loading and ejecting the magazine.

2. Description of the Related Art

There has been known a library apparatus, in which the magazine housing therein a plurality of cartridges, each of which receives therein a storage medium, is loaded, a storage medium in a desired cartridge is accessed to be taken out for loading to a medium drive device for performing reading and/or writing information from and in the medium. Among this kind of library apparatus, as a loading mechanism for loading and unloading a magazine employing a digital audio disk (DAD), such as a compact disk or the like, as the storage medium, has been disclosed in Japanese Unexamined Patent Publication (Kokai) No. Heisei 9-245410, for "Magazine Loading Type Disk Drive", Japanese Patent No. 2568065, for "Multi-Disk Player".

The loading mechanisms for loading and unloading the magazines as disclosed in the above-identified publications are designed for performing loading and unloading utilizing a driving force of a motor in view of that a conventionally employed structure for manually loading and unloading the magazine utilizing a biasing means, such as a spring or the like, can cause unstability in loading and unloading operation of the magazine.

General construction of the magazine loading mechanism utilizing the driving force of the motor, as set for above, is illustrated in FIG. 36. In a magazine 2 to be provided for a library apparatus 1 houses three cartridges 3, each of which receives therein a storage medium. On the lower portion of the external side surface of a casing of the magazine 2, a rack 2a are provided. On the other hand, in the front side portion of the library apparatus 1, the cartridge transporting mechanism which can be lifted up and down, is arranged. On a lower portion in the rear side, a medium driving device 5 for performing reading from and writing in the storage medium housed in the cartridge, is arranged. In the upper side of the medium driving device 5, a holder device 6 for receiving the loaded magazine 2, is arranged. The magazine 2 is inserted into the holder device 6 through an opening formed in the front side. On the side edge of the opening, a magazine feeding motor 7 is provided. On an output shaft of the magazine feeding motor, a pinion 8 for meshing with the rack 2a of the magazine is secured. On the front surface of the housing of the library apparatus 1, a lid body 1a which swings about one edge thereof for opening and closing an opening formed therein.

Upon loading the magazine in the library apparatus, by pushing the lid body 1a with the magazine 2, the lid body 1a is opened in response to pushing force exerted through the magazine 2 for permitting insertion of the magazine 2. At this time, the cartridge transporting mechanism 3 is located at a lowered position. The magazine 2 is moved as guided by an upper surface of the cartridge transporting mechanism 3.

When the magazine is pushed to locate the rack 2a providing on the casing of the magazine 2 to mesh with the pinion 2a, the position of the magazine 2 is detected by a not shown sensor. By a detection signal of the sensor, the magazine feeding motor 7 is actuated to drive the pinion for rotation. By rotation of the pinion, the rack 2a is driven to move for drawing the magazine 2 into the holder device 6. When the magazine 2 is inserted to a predetermined position within the holder device 6, the magazine at the predetermined position is detected by a not shown sensor. In response to the detection signal of the sensor, the magazine feeding motor 7 is stopped to place the magazine in a condition loaded in the library device.

In the condition where the magazine 2 is loaded, the storage media housed in the cartridges received within the magazine can be loaded on the medium driving device 5. Upon loading the storage medium on the medium driving device 5, the cartridge transporting mechanism 4 is elevated up to the position opposing to the desired cartridge 3. Then, by means of a not shown gripping means provided in the cartridge transporting mechanism 4, the cartridge 3 is gripped and is withdrawn from the magazine 2 by inserting and withdrawing mechanism which is designed to move the gripping means in horizontal direction, Then, the cartridge 3 is held on the cartridge transporting mechanism 4. Thereafter, the cartridge transporting mechanism 4 is lowered to oppose to the medium driving device 5. Then, the held cartridge is pushed out to insert into the medium driving device 5. Thus, reading and writing from and in the storage medium housed in the cartridge 3 can bed performed. For exchanging the storage medium, the cartridge 3 is withdrawn from the medium driving device 5 by the cartridge transporting mechanism 4 to return into the magazine 2, and then, another cartridge 3 is withdrawn from the magazine and insert into the medium driving device 5.

However, in the conventional library device, a lifting motor for driving the cartridge transporting mechanism 4 for lifting up and down, a inserting and withdrawing motor for driving the gripping means in horizontal direction for moving the cartridge 3 and so forth are incorporated in addition to the magazine feeding motor 7. Namely, since at least three motors are employed, a large number of parts are required and construction becomes complicate. Also, since at least three motors are provided, installation spaces therefore are required to increase the size of the library apparatus.

On the other hand, since the pinion 8 has to be arranged at the position out of the range of up and down motion of the cartridge transporting mechanism 4, the pinion 9 is arranged in the vicinity of the holder device 6. On the other hand, when the magazine 2 is ejected from the library apparatus 1, the magazine 2 has to be projected from the lid body 1a of the library apparatus 1 in the extent of permitting gripping by human finger. Furthermore, at this projected position, the tip end of the rack 2a has to be kept in meshing engagement with the pinion 8. Therefore, a length of the magazine in the loading direction has to correspond to a sum of a length of the cartridge transporting mechanism 4 and a length to project from the library apparatus 1. Therefore, the magazine 2 is required to have approximately double of a length of the cartridge 3 to make the magazine bulky.

SUMMARY OF THE INVENTION

Therefore, it is an object of the present invention to provide a library apparatus which can reduce number of motors to be incorporated and whereby to reduce number of parts for simplification of construction, contributing to down-sizing of the apparatus and reducing a cost.

According to one aspect of the present invention, a library apparatus of a storage media for reading and/or writing information from and in a storage medium housed in a cartridge by withdrawing a desired one of a plurality of cartridges housed within a magazine which is loaded in an apparatus body, by cartridge loading and unloading means and loading the withdrawn cartridge in medium drive means, comprises:

the cartridge loading, and unloading means performs loading and unloading of the magazine to the apparatus body.

Namely, by the cartridge loading and unloading means performing loading and unloading the cartridge from the magazine, loading and unloading of the magazine is also performed. Therefore, dedicated motor for loading the magazine is unnecessary to provide. Therefore, number of parts can be reduced and construction can be simplified.

In the preferred construction, a magazine holder for receiving the magazine is provided within the apparatus body, and the cartridge loading and unloading means transports the magazine inserted through a magazine insertion opening of the apparatus body to the magazine holder, and then grips and withdraws a desired one of cartridges from the loaded magazine.

The cartridge loading and unloading means may transport the magazine inserted through the magazine insertion opening by repeating operation for a plurality of times.

Since the magazine houses the cartridges, the size of the magazine is greater than the size of the cartridges. The stroke of loading and unloading operation by the cartridge loading and unloading means is required to be sufficiently large for loading and unloading the cartridge, which is not sufficient for loading and unloading the magazine in and from the library apparatus. In such case, the magazine inserted through the magazine insertion opening of the apparatus body can be transported to the magazine holder by repeating operation for a plurality of times.

The cartridge loading and unloading means may be mounted on cartridge moving means which is moved up and down with mounting the cartridge loading and unloading means. The cartridge loading and unloading means may be provided with latching portion and the magazine is provided with a latch receiving portion for releasably engaging with the latching portion, and the latching portion and the latch receiving portion may be engaged and released by up and down motion of the cartridge loading and unloading means by the cartridge moving means.

One cartridge withdrawn from the magazine by the cartridge loading and unloading means is moved to the media drive means by the cartridge moving means as supported by the cartridge loading and unloading means. Also, when one cartridge is moved to the medium drive means by the cartridge moving means after withdrawing one cartridge form the magazine by the cartridge loading and unloading means, the magazine is separated from the cartridge loading and unloading means.

The library apparatus may further comprise magazine positioning means for positioning the magazine inserted through the magazine insertion opening at a predetermined position located away from the magazine holder, and the cartridge loading and unloading means may transport the magazine from the predetermined position to the magazine holder. The magazine positioning means may be provided on a lid body closing the magazine insertion opening and may be responsive to pushing of the magazine through the magazine insertion opening to be placed at open position, the magazine positioning means may engage with the magazine in the condition where the lid body is opened, to position the magazine at the predetermined position, the magazine positioning means may release engagement with the magazine as shifted by driving means, the cartridge loading and unloading means may transport the magazine into the magazine holder after releasing the magazine positioning means from the magazine.

By this, unless the magazine is not positioned at the predetermined position, it cannot be loaded. Therefore, loading operation can be performed certainly.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
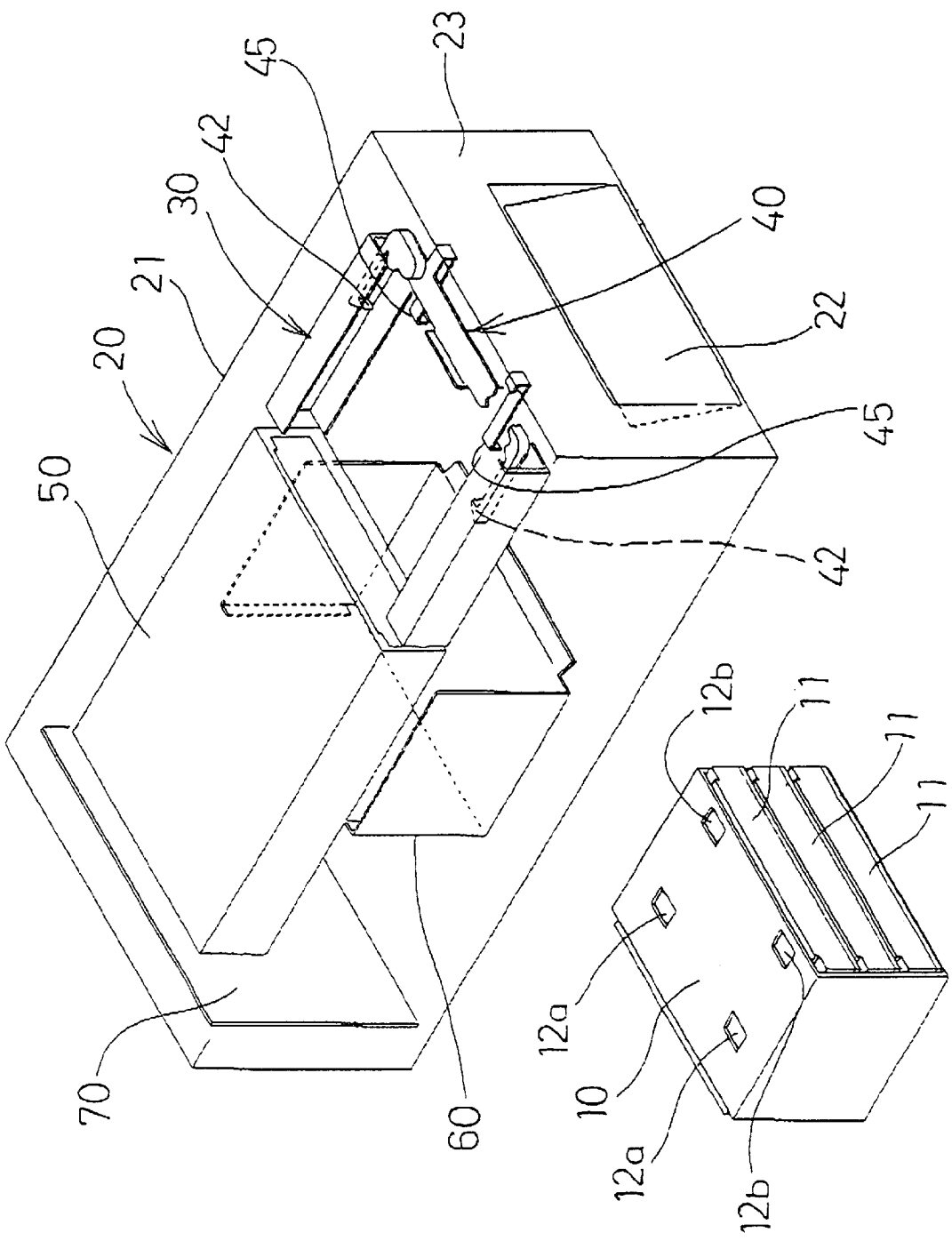
FIG. 1 is a perspective view seeing through an general construction of the internal structure of a library apparatus according to the present invention, which the library apparatus is illustrated together with a magazine adapted to the shown library apparatus.

FIG. 1 is a schematic perspective view showing a library apparatus 20 and a magazine 10 to be loaded in the library apparatus. A housing of the library apparatus 20 is illustrated in see through manner for explanatorily showing the internal construction.

To the magazine 10 to be loaded to the library apparatus 20, a desired number of cartridges 11 are releasably received. In the shown embodiment, three cartridges 11 are received in the magazine 10. In each cartridge 11, a storage medium for reading and writing information or both is received. At an appropriate position on the upper surface of a top plate of the magazine 10, a latch receiving portion 12 serving as latching receiving means formed by a recessed portion, through opening or the like of an arbitrary shape, is provided. In the shown embodiment, the four latch receiving portions are formed in the top plate at four positions. The latch receiving portion formed on the rear side of the library apparatus is identified by the reference numeral 12a, and the latch receiving portion formed on the front side of the library apparatus is identified by the reference numeral 12b.

The library apparatus 20 is constructed with a housing 21 formed in substantially rectangular parallelpiped shape, a cartridge transporting device 30, a medium driving device 50 as medium driving means for performing reading and writing information for the storage medium received in the cartridge 11, a magazine holder 60 holding the magazine within the housing 21, and control portion 70 for controlling operation of the library apparatus 20, The cartridge transporting device 30, the medium driving device 50, the magazine holder 60 and the control portion 70 are housed within the housing 21. On the other hand, in the front surface of the housing 21, a lid body 22 swingable about a lower edge. The lid body 22 is installed on the front mask 23.

Figure 2:
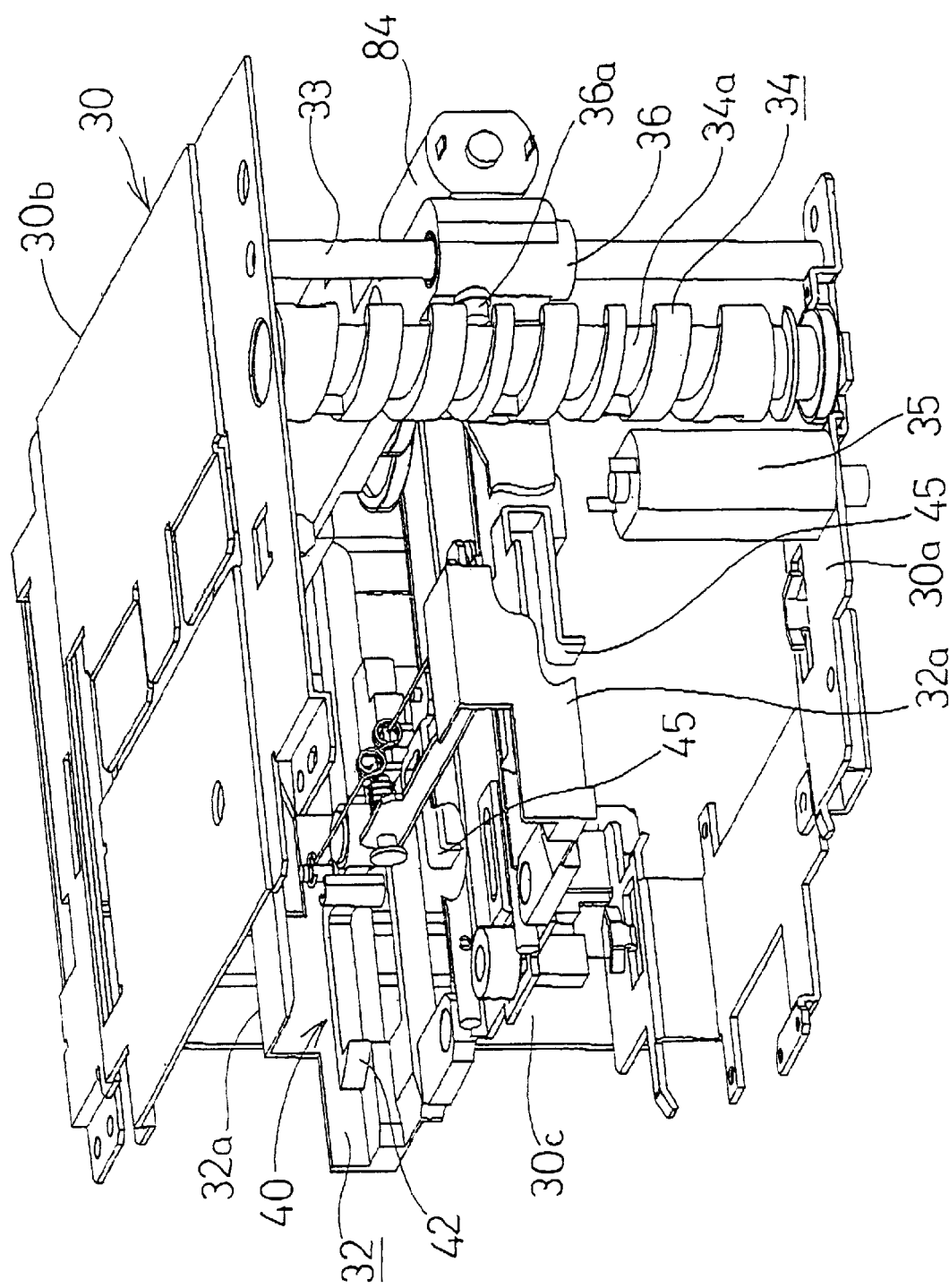
FIG. 2 is a schematic perspective view for explaining a construction of a cartridge transporting mechanism of the library apparatus according to the present invention.

FIG. 2 is a perspective view showing a general construction of the cartridge transporting device 30. As shown in FIG. 1, the cartridge transporting device 30 is arranged at the front portion of the housing 21. The cartridge transporting device 30 is constructed by mounting a hand device 40 which is movable in a direction for loading and unloading the cartridge 11 into and from the medium driving device 50 and thus serve as the cartridge loading and unloading means, and a picker device 32 as cartridge moving means, on which the cartridge transporting device 30 is mounted. The picker device 32 is disposed between a bottom base 30a as lower bas plate and a top base 30b as an upper base plate. On edge portions on the front side of the bottom base 30a and the top base 30b, vertically extending guide rods 33 are supported at both end portions. The other edge portions of the bottom base 30a and the top base 30b are connected by a wall plate 30c. Namely, a frame is formed by the bottom base 30a, the top base 30b, the guide rod 33 and the wall plate 30c. The picker device 32 is arranged within the frame.

Adjacent the guide rod 33, a screw shaft 34 is arranged. Both ends of the screw shaft 34 are rotatably supported on the bottom base 30a and the top base 30b. A shaft driving motor 35 is supported in the vicinity of the screw shaft 34. Rotation of an output shaft of the shaft driving motor 35 is transmitted to the screw shaft 34 via a power transmission mechanism, such as a not shown gear train.

On the other hand, a slider 36 is provided at one end portion of a picker base 32a of the picker device 32. The guide rod 33 is inserted through a through hole formed in the slider 36. Therefore, the picker device 32 is lifted up and down as guided by the guide rod 33. It should be noted that it may be preferred to connect the picker device 32 and the guide rod 33 by not shown guide means, such as a vertically extending guide hole formed as elongated hole in the wall plate 30c, and providing guide projection loosely inserting into the guide hole on the picker base 32a, for smoothly lifting up and down the picker device 32. Then, a guide pin 36a is extended from the slider 36. A tip end portion of the guide pin 36a is loosely inserted into a screw groove 34a of a screw portion of the screw shaft 34.

Figure 3:
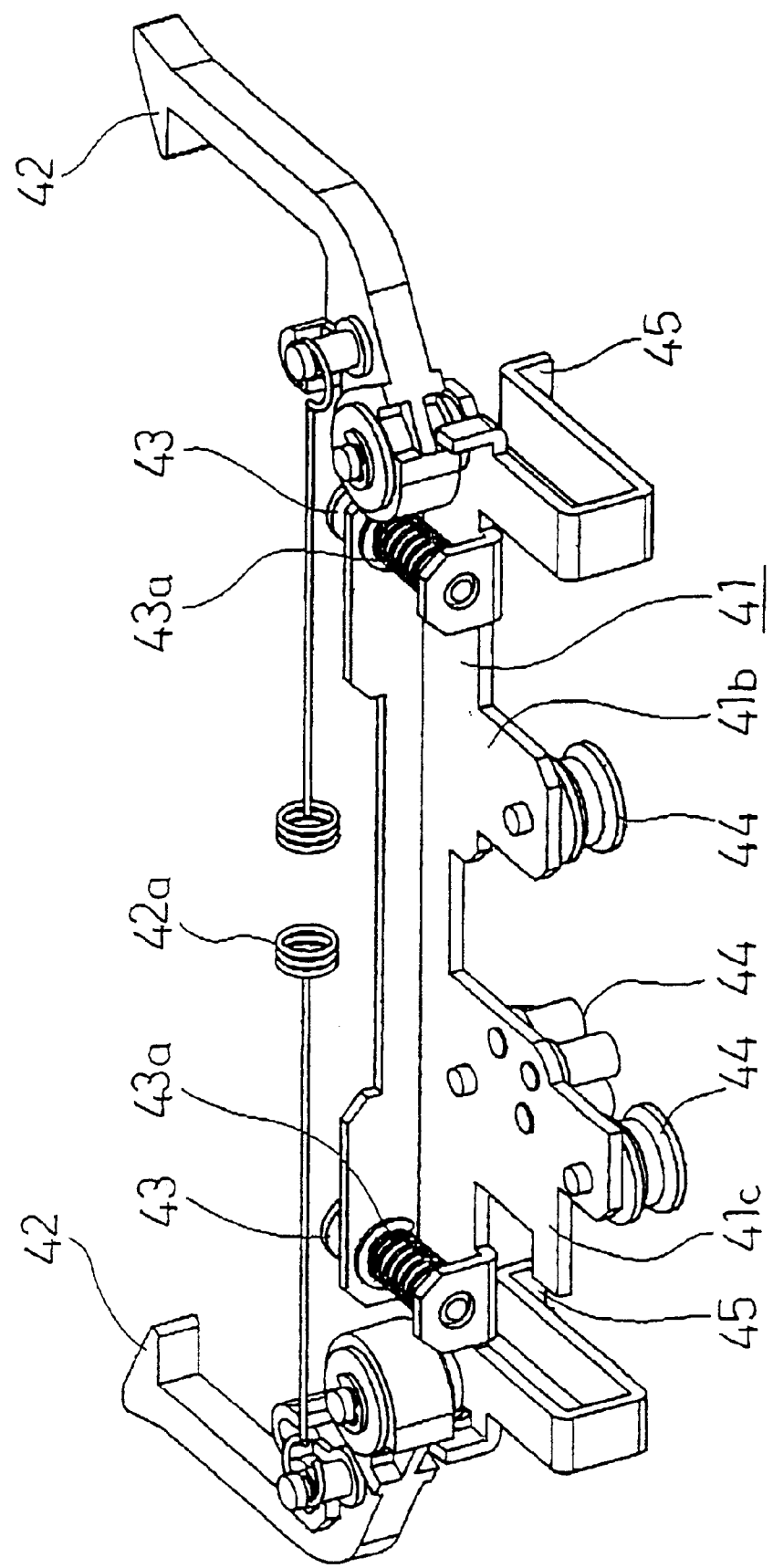
FIG. 3 is a schematic perspective view for explaining a construction of a hand device built in the cartridge transporting device.

The hand device 40 is provided on the picker base 32a of the picker device 32. FIG. 3 is a perspective view showing a general construction of the hand device 40 as viewed from the front side. The hand device 40 has a hand plate 41. On both end portions of the hand plate 41, a pair of hands 42 are supported for pivoting about vertical axes. By pivoting motion, the hands 42 are opened and closed for gripping the side surfaces of the cartridge 11 at the closed position. In the vicinity of the base end portion of a pair of hands 42, a hand spring 42a is stretched. By a restoring force of the hand spring 42a, the hands 42 are biased in closing direction. On the other hand, at a position between a pair of hands 42, a pair or pushers 43 are slidably supported in moving direction of the hand plate 41. The pushers 43 are biased by restoring force of the pusher springs 43a to extend toward the hands 42. It should be noted that the opening and closing mechanism of the hands 42 may be similar to the known mechanism.

In the center portion of the hand plate 41, bracket portions 41b and 41c are formed projecting frontwardly. On the lower side of the bracket portions 41b and 41c, a guide roller 44 are rotatably supported. Then, both ends of the front side of the hand plate 41 are bent at front end portion into substantially channel shaped configuration after projecting frontwardly, and are bent downwardly at rear end portion for forming hooking craw portions 45 as latching means. The hooking claw portion 45 is formed into a shape releasably engaging with latch receiving portion 12 formed in the magazine 10. It should be noted that the hand device 40 may be similar to the conventionally known mechanism and in the alternative, a construction, in which the hooking claw portion 45 is provided for the known mechanism.

Figure 4:
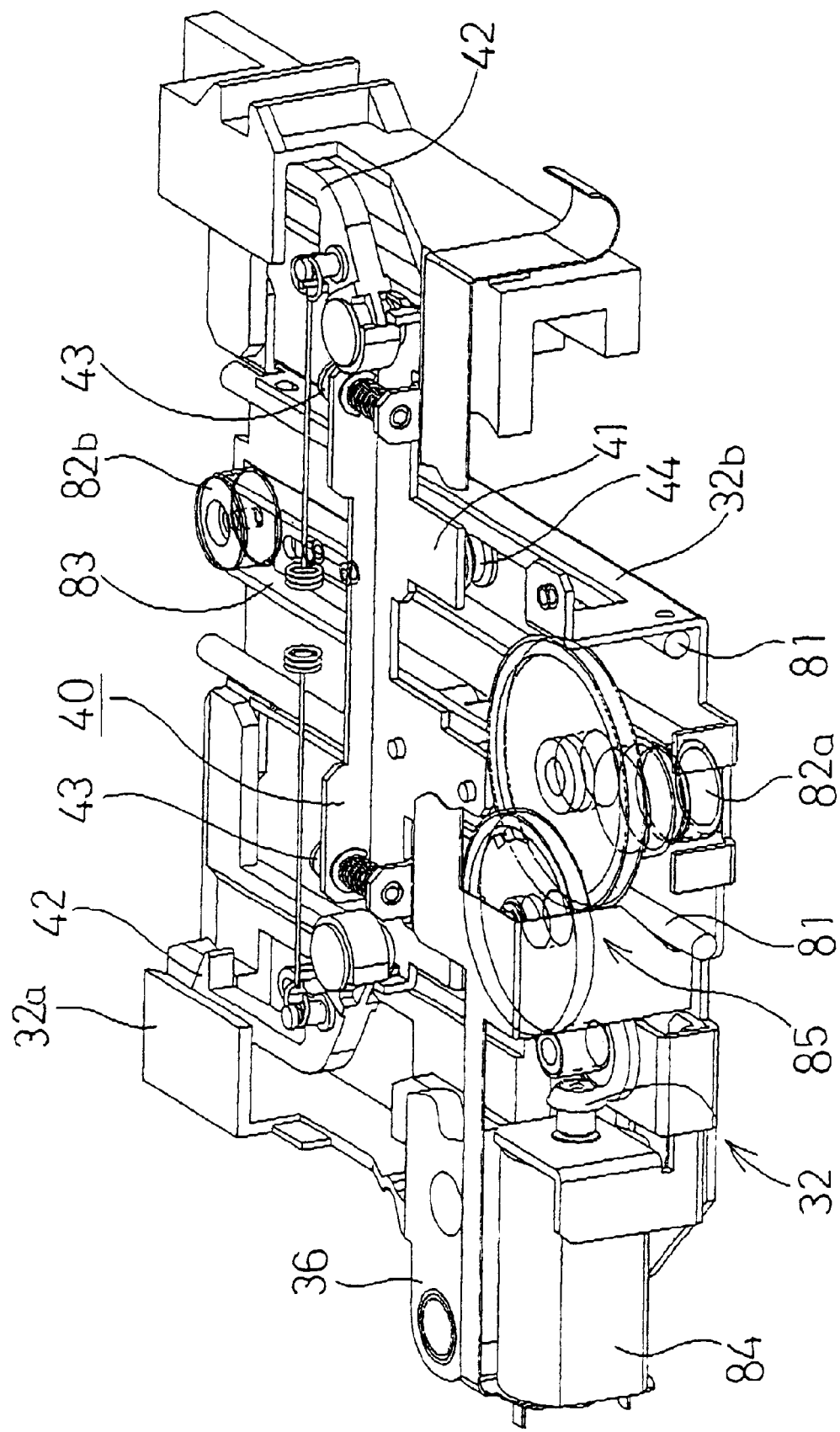
FIG. 4 is a schematic perspective view for explaining a construction of a picker device built-in the hand device which is, in turn, built-in the cartridge transporting device.

FIG. 4 is a perspective view showing a general construction of the picker device as viewed from the front side. As shown in FIG. 4, in the lower portion of the picker base 32a, a gear base plate 32b is mounted. On the gear base plate 32b, a pair of guide rails 81 are mounted with orienting its longitudinal axis along a moving direction of the hand plate 41. On the other hand, between a pair of guide rails 81, a pair of driving pulleys 82a and 82b provided at front and rear end portions of the gear base plate 32b are rotatably supported. Between these driving pulleys 82a and 82b, a drive belt 83 is stretched. On the other hand, on the side portion of the front portion of the gear plate 32b, a hand driving motor 84 is mounted so that rotation of an output shaft thereof is transmitted to the driving pulley 82a with appropriately changing speed by an appropriate gear train 85.

Then, the hand plate 41 is secured to the driving belt 83. On the other hand, the guide rollers 44 are engaged with the guide rail 81. Accordingly, when the driving belt 83 is driven by the driving pulleys 82a and 82b, the guide rollers 44 are guided along the guide rails 81 for moving the hand plate 41 in horizontal direction.

Figure 5:
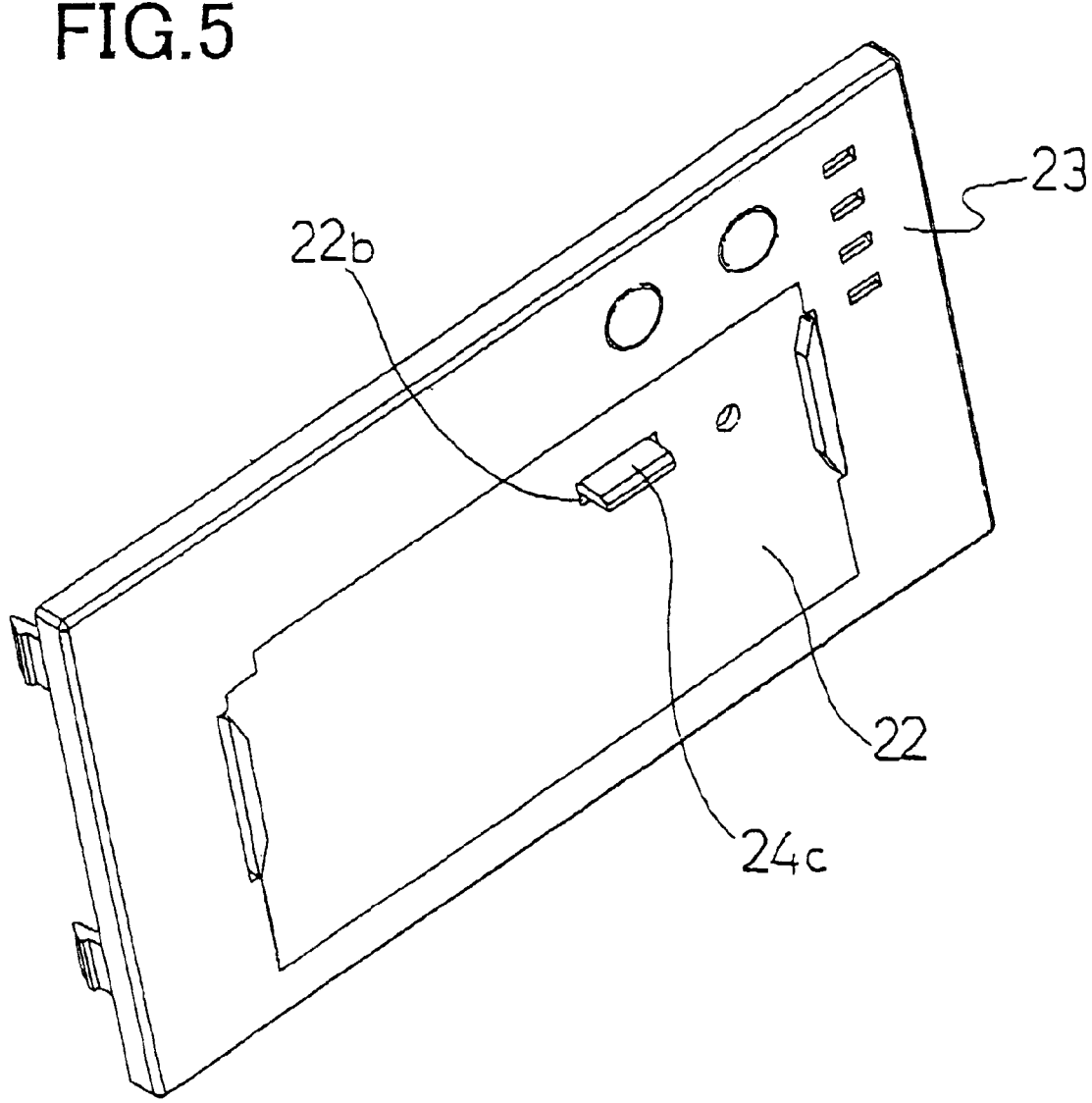
FIG. 5 is a schematic perspective view showing a lid body and a front mask of the library apparatus as viewed from outside of the library apparatus, for explaining a mounting structure of the lid body.
Figure 6:
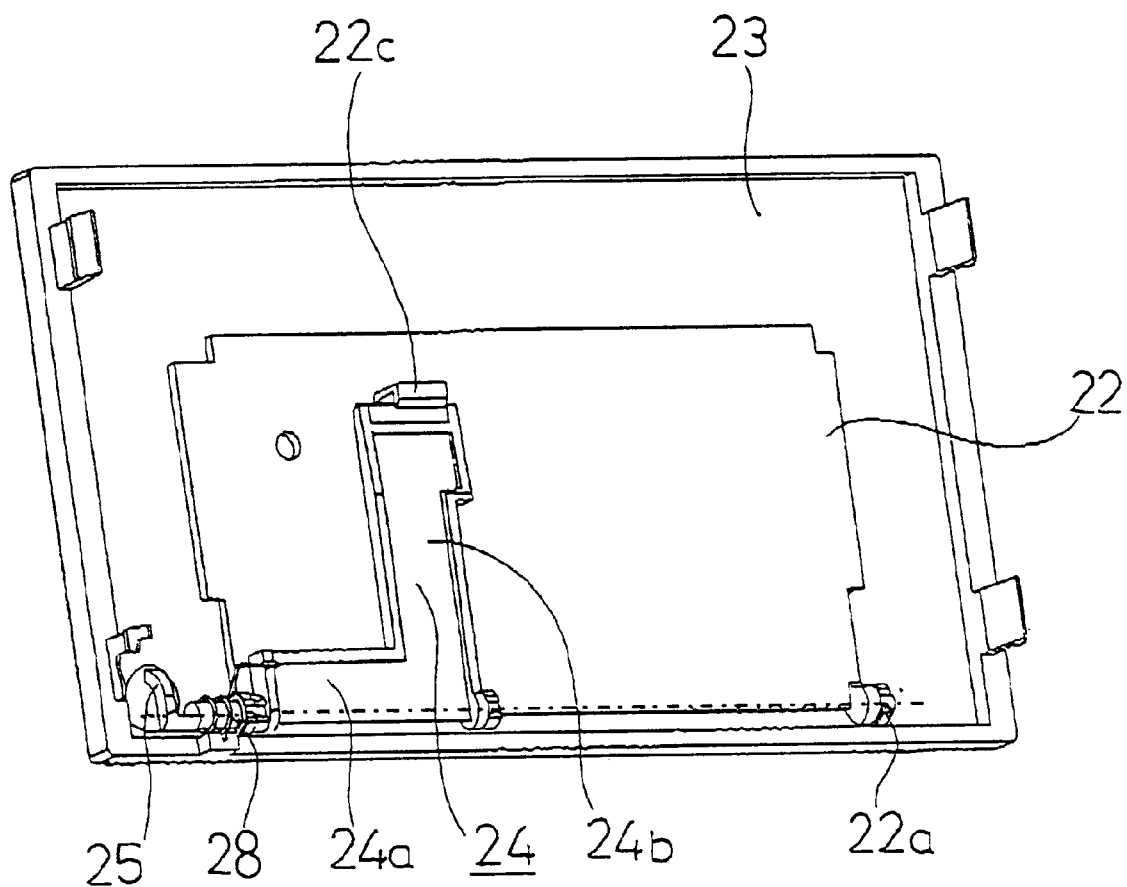
FIG. 6 is a schematic perspective view showing a lid body and a front mask of the library apparatus as viewed from inside of the library apparatus, for explaining a mounting structure of the lid body.
Figure 7:
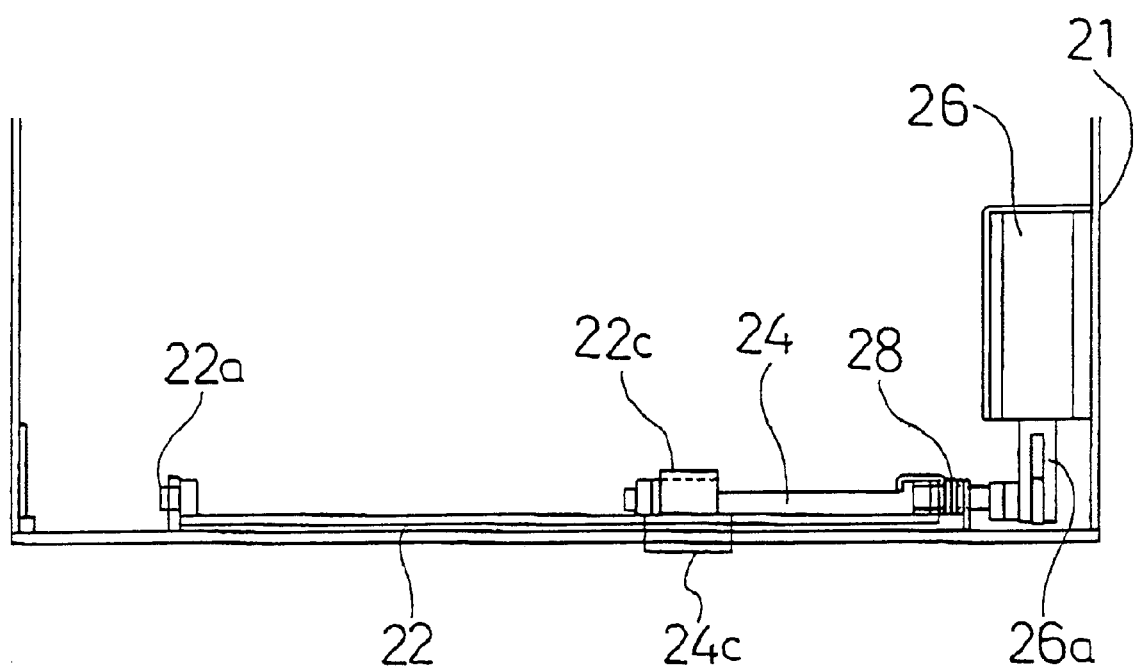
FIG. 7 is a sectional plan view showing the library apparatus shown by cutting out the front portion for explaining the mounting structure of the lid body.
Figure 8:
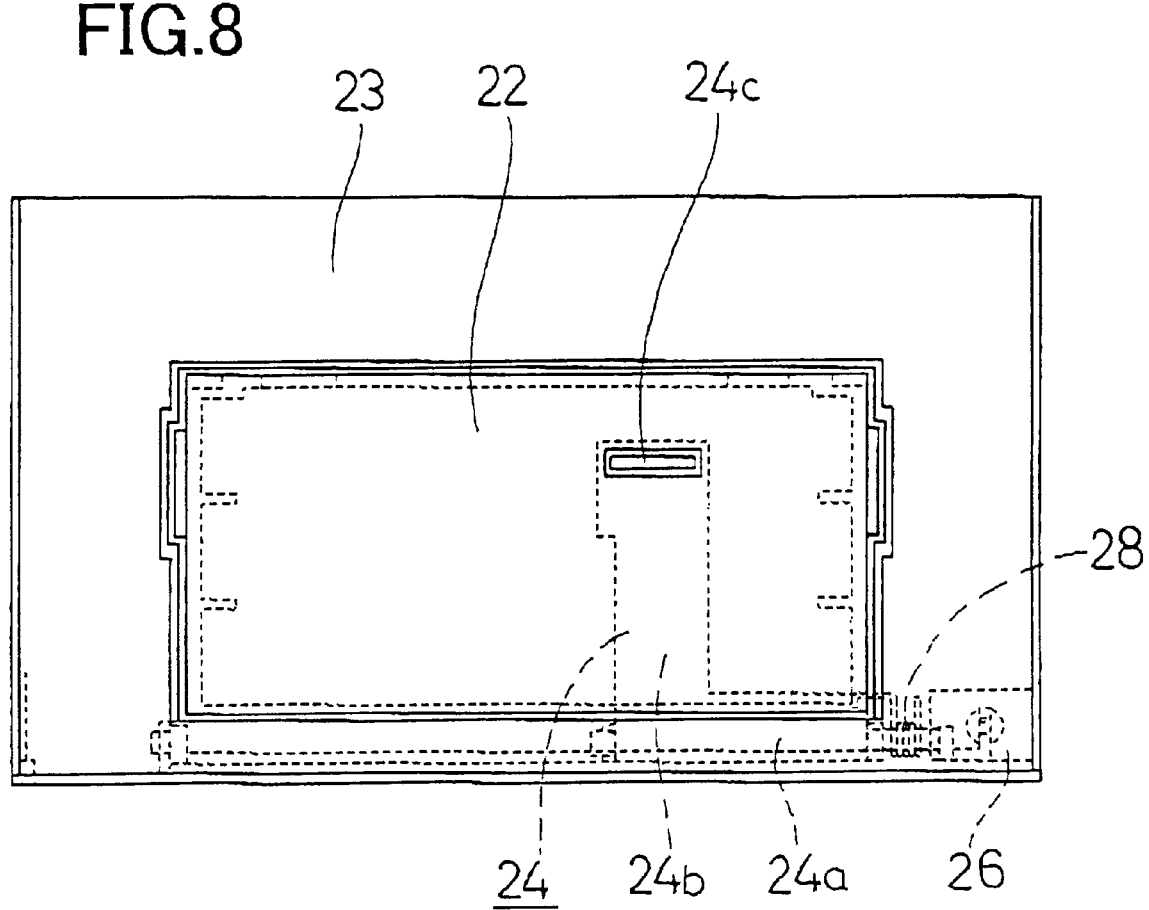
FIG. 8 is a partly sectioned front elevation of the library apparatus with partly cutting out the front portion thereof for explaining the mounting structure of the lid body.
Figure 9:
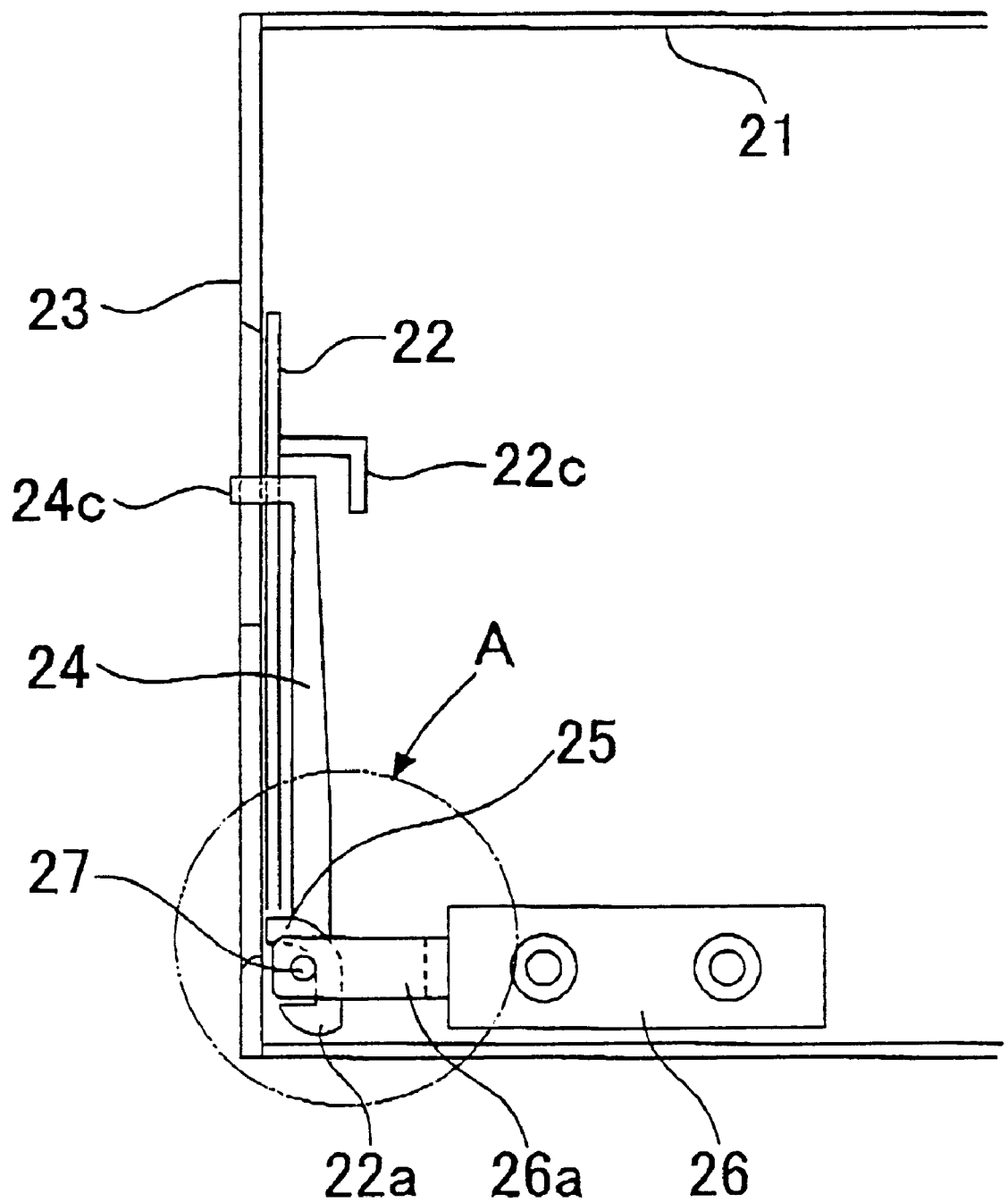
FIG. 9 is a partly sectioned right side elevation of the library apparatus with partly cutting out the front portion thereof for explaining the mounting structure of the lid body.

FIGS. 5 and 6 are illustration of the lid body 22. FIG. 5 is a perspective view of the lid body as viewed from outside of the housing 21 and FIG. 6 is a perspective view of the lid body as viewed from inside of the housing. A lower center portion of the front mask 23 is formed an opening to define a magazine insertion opening. The lid body 22 is provided for closing the magazine insertion opening. The lid body 22 is supported by a shaft 22a extending along the lower side edge of the front mask 23 for pivotal motion thereabout. At a position offset from the center portion, the lid body 22 is formed with an engaging hole 22b which is substantially rectangular through opening. In the upper portion of the engaging hole 22b, a hook portion 22c is formed for covering the engaging hole 22b with a given distance from a back surface of the lid body 22 by projecting rearwardly and downwardly bending the tip end.

On the back surface of the lid body 22, a substantially L-shaped lid body engaging plate 24 is arranged. A support arm 24a forming a part of the L-shaped lid body engaging plate 24, extends along the lower edge portion of the lid body 22 to reach the side portion of the lid body 22. On the other hand, an action arm 24b forming the other portion of the L-shaped lid body engaging plate 24 extend to the position opposing to the engaging hole 22b. The tip end portion of the action arm 24b is bent frontwardly to form an engaging projection 24c. The engaging projection 24c extends through the engaging hole 22b to project to the front surface side of the lid body 22 for a predetermined length. The support arm 24a of the lid body engaging plate 24 is supported coaxially with the shaft 22a of the lid body 22 so that the lid body engaging plate 24 may pivot about the shaft 22a.

Figure 10:
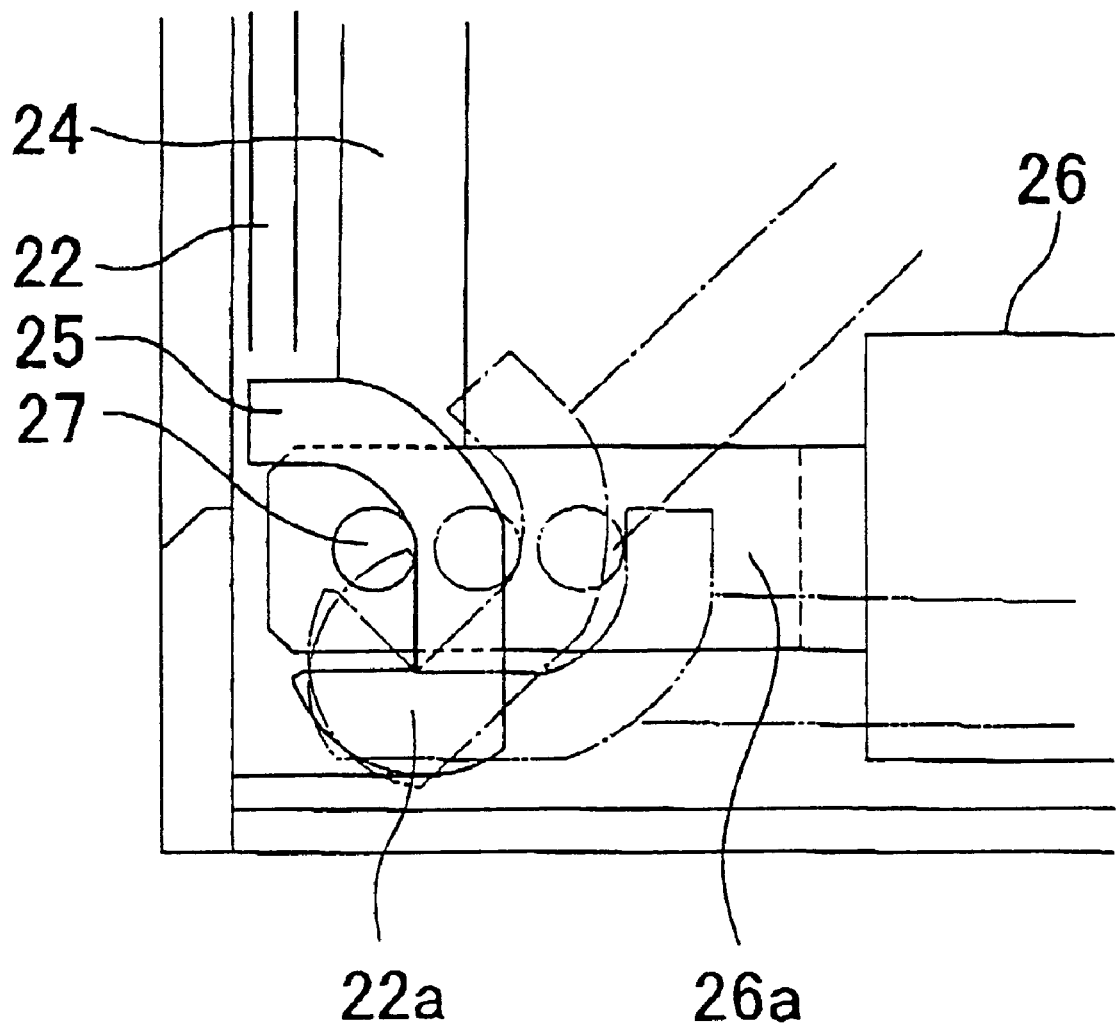
FIG. 10 is an enlarged view of portion A in FIG. 9.

On the other hand, an engaging hook portion 25 is formed in the tip end portion of the support arm 24a, as shown in FIG. 10. The engaging hook portion 25 is formed into arc-shaped configuration with a curvature centered at about an axis parallel to the shaft 22. On the rear side of the engaging hook 25, a solenoid 26 which serves as positioning means driving means is provided as fixed on the bottom plate of the housing 21. An actuation rod 26a of the solenoid extends frontwardly. An engaging portion 27 formed at the tip end of the actuation rod 26a is engaged with the arc-shaped engaging hook portion 25 at the inside of the arc. Therefore, when the solenoid 26 is actuated to retract the actuation rod 26a, the engaging hook portion 25 is pivoted. Then, the lid body engaging plate 24 having the engaging hook 25 is pivoted about the shaft 22 so that the engaging projection 24c is retracted within the engaging hole 22b. On the other hand, the lid body engaging plate 24 is biased by the restoring force of a return spring 28 which is formed with a torsion coil spring, toward the back surface of the lid body 22.

Figure 33:
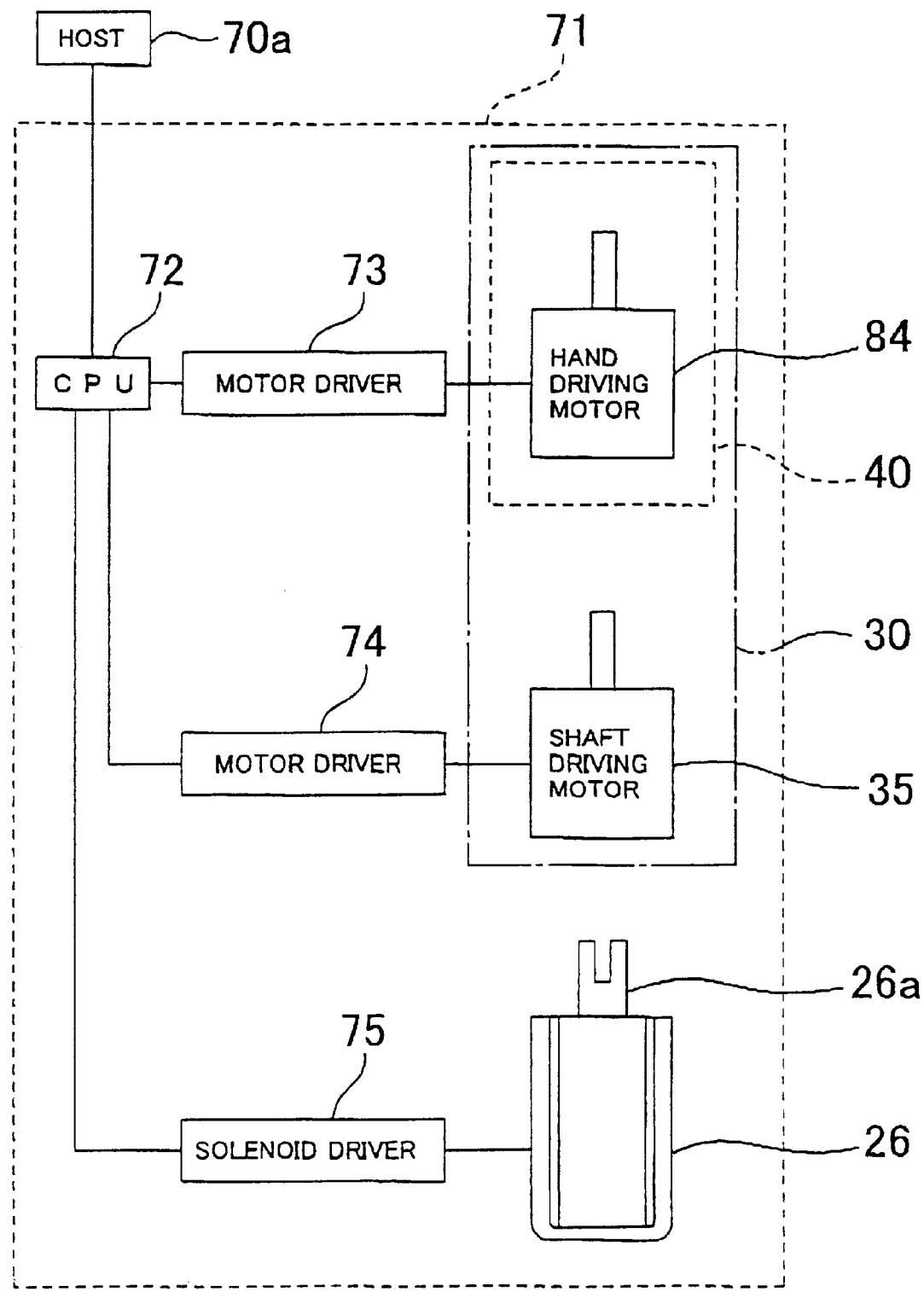
FIG. 33 is a schematic block diagram of a control portion for controlling driving upon loading and unloading the magazine into and from the library apparatus according to the present invention.

In the control portion 70, a drive control portion 72 is included for driving the shaft driving motor 35, the hand driving motor 84 and the solenoid 26. FIG. 33 is a block diagram showing a general construction of the drive control portion 71. The drive control portion 71 includes CPU 72 executing a predetermined sequence according to a command from a host computer 70a as a superior unit, a motor drivers 73 and 74 for outputting drive signals according to a command from CPU 72, and a solenoid driver 75.

The shaft driving motor 35 for lifting the picker device 32 up and down, is driven for revolution in the direction commanded by an output signal of the motor driver 74. Also, the hand driving motor 84 for shifting the hand plate 41 is driven for revolution in the direction commanded by an output signal of the motor driver 73. On the other hand, the solenoid 26 is turned ON and OFF by the output signal of the solenoid driver 75 for shifting the actuation rod 26a in the given direction.

The operation of the library apparatus according to the present invention constructed as set forth above, will be discussed with reference to flowcharts shown in FIGS. 34 and 35.

Figure 34:
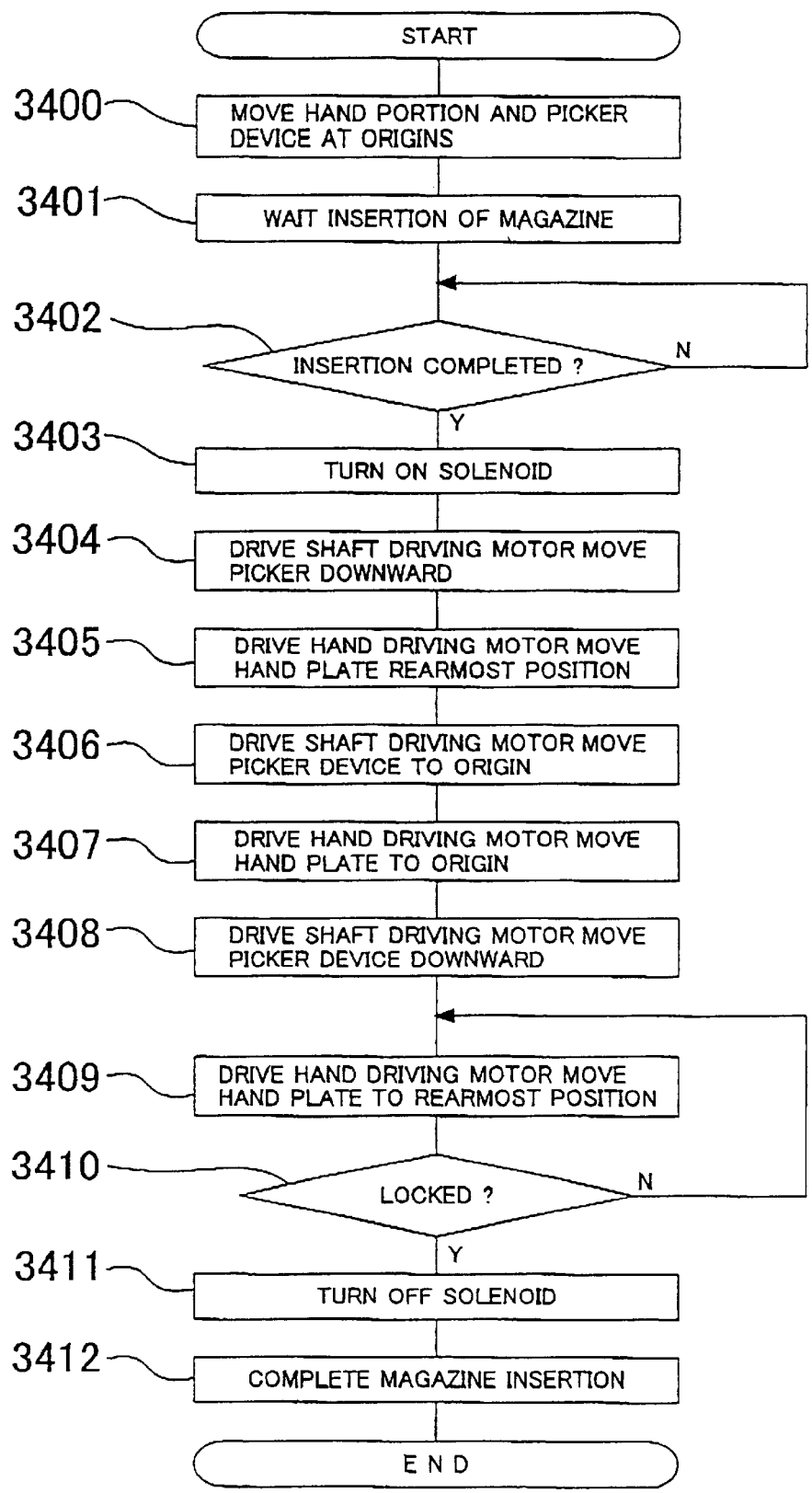
FIG. 34 is a flowchart for showing the case where the magazine is loaded in the library apparatus.

FIG. 34 is a flowchart showing the case where the magazine 10 is loaded in the library apparatus 10. For waiting insertion of the magazine 10 through the magazine insertion opening, the picker device 32 is elevated at the uppermost position and thus is located at a transportation home position (hereinafter referred to as "transporting HP") as an origin, and the hand device 40 is shifted to the most frontwardly shifted position at an origin which position is referred to as loading and unloading home position (hereinafter referred to as "loading and unloading HP"), respectively (step 3400). Thus, preparation for loading the magazine 10 is completed (step 3401).

Figure 11:
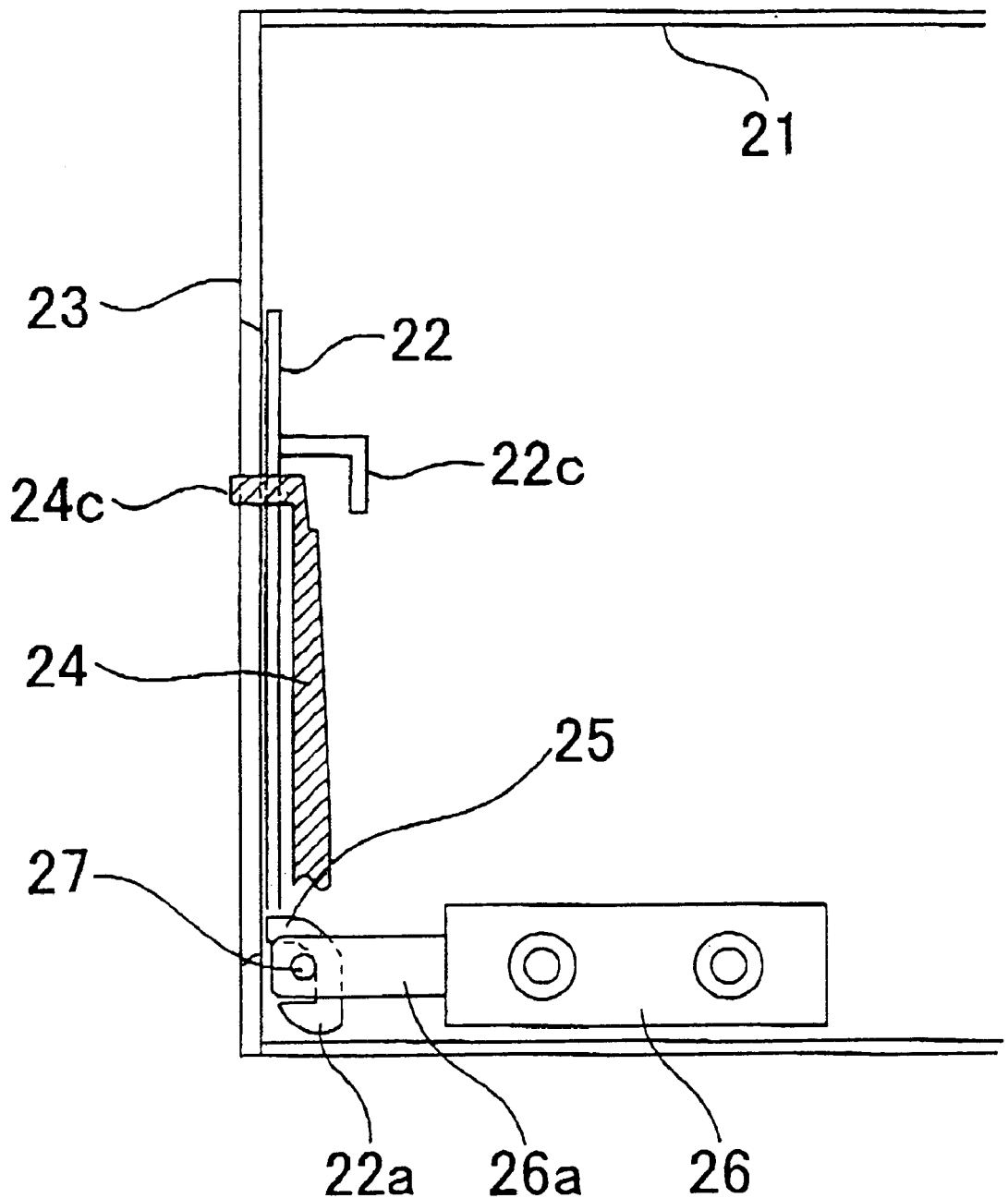
FIG. 11 is a partly sectioned right side elevation of the front portion of the library apparatus for explaining operation of the lid body upon insertion of a magazine, showing a condition where the lid body is closed.

FIG. 11 is a schematic sectional view showing the library apparatus in the condition before insertion of the magazine, with cutting out the side surface thereof. At this condition, the lid body engaging plate 24 is biased by the restoring force of the return spring 28 to abut against the lid body 22 to place the latter in a condition closing the magazine insertion opening. At this condition, the engaging projection 24c formed at the tip end portion of the action arm 24b of the lid body engaging plate 24 is projected front side of the lid body through the engaging hole 22b formed through the lid body 22. On the other hand, the actuation rod 26a of the solenoid 26 is maintained in projected position.

Figure 12:
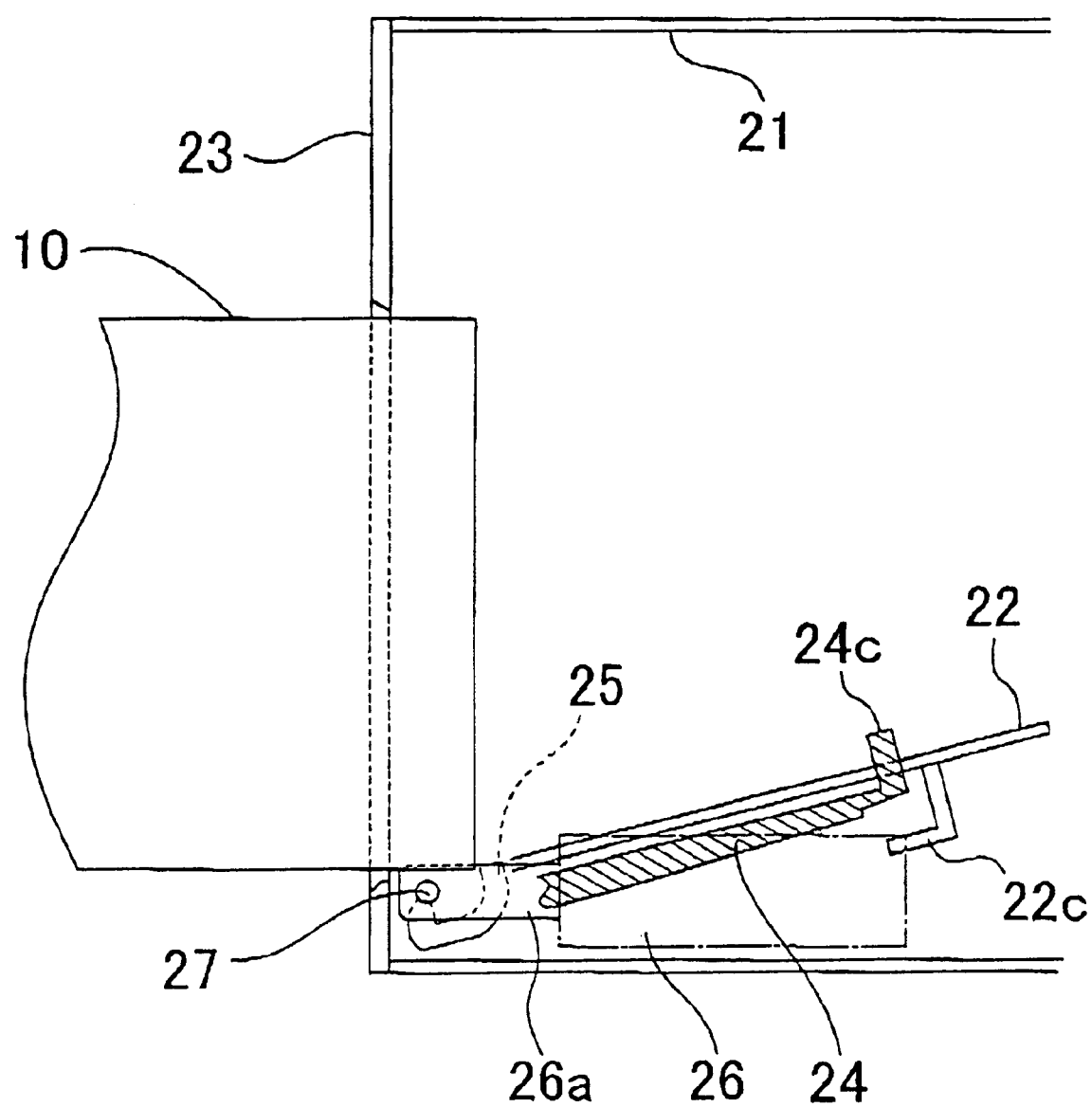
FIG. 12 is a partly sectioned right side elevation of the front portion of the library apparatus for explaining operation of the lid body upon insertion of a magazine, showing a condition immediately after insertion of the magazine.
Figure 17:
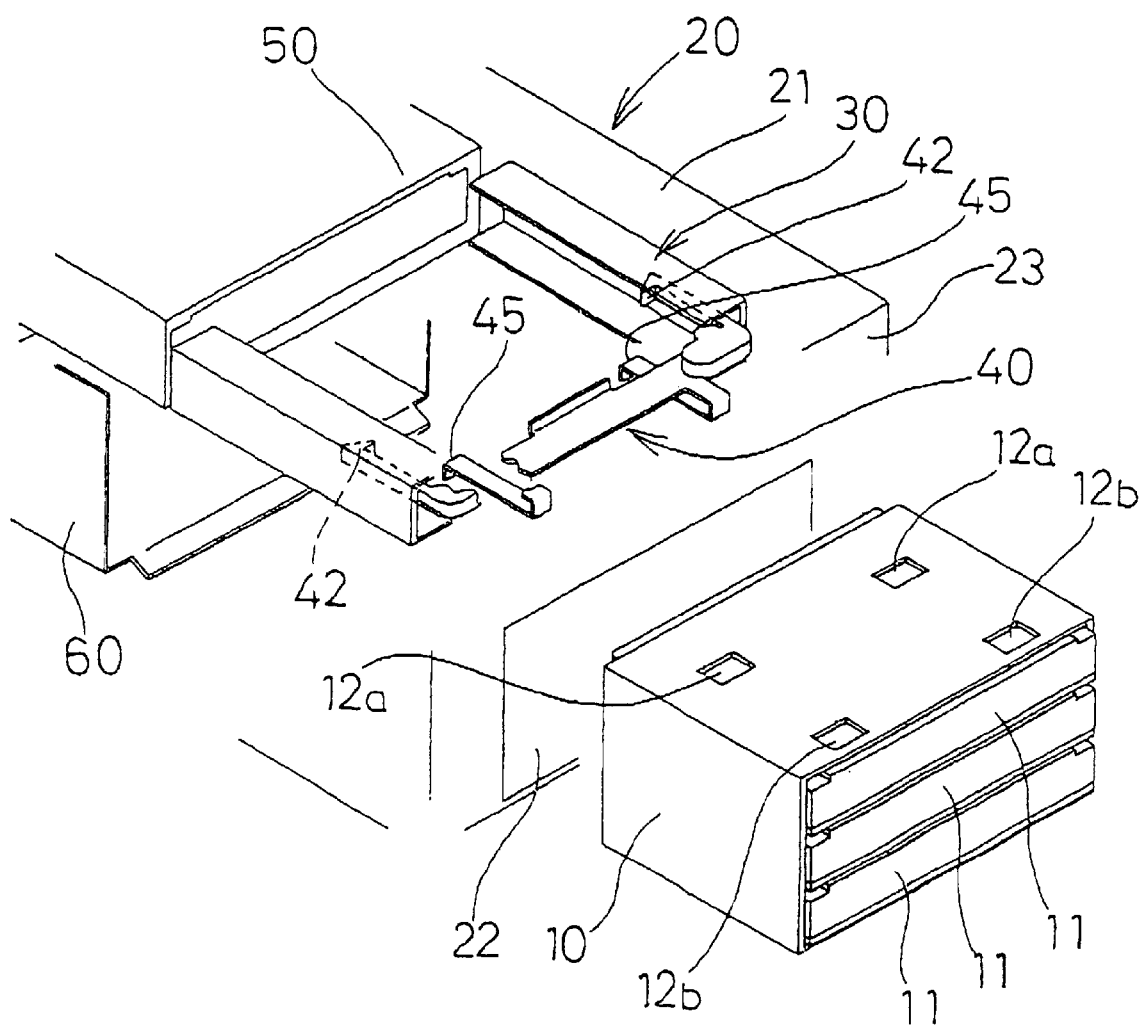
FIG. 17 is a perspective view of the front portion of the library apparatus illustrated with omitting a part of the library apparatus in order to explain operation upon loading the magazine in the library apparatus, which shows a condition before loading the magazine.
Figure 18:
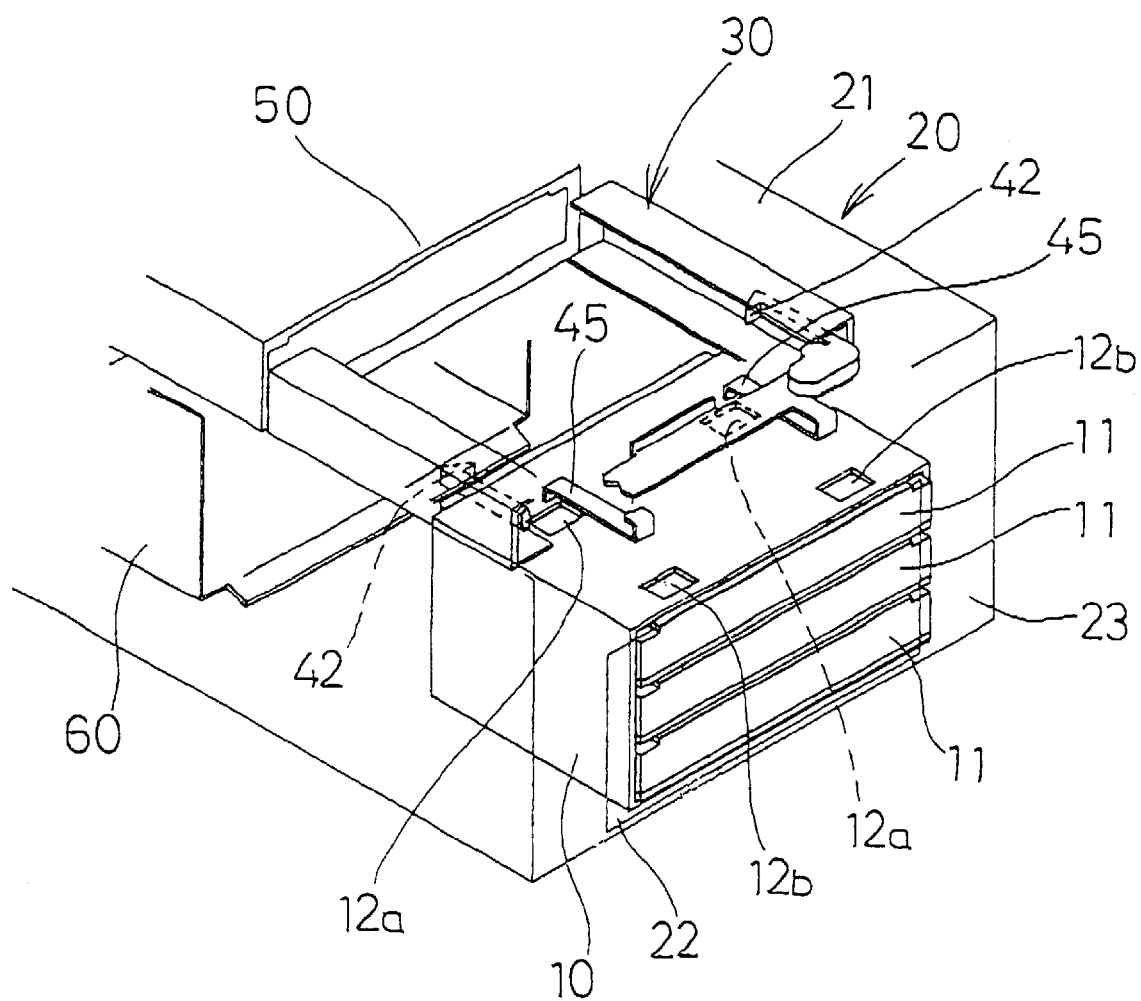
FIG. 18 is a perspective view of the front portion of the library apparatus illustrated with omitting a part of the library apparatus in order to explain operation upon loading the magazine in the library apparatus, which shows a condition where the magazine is inserted into an insertion opening.

Upon loading the magazine 10 in the library apparatus 20, as shown in FIG. 17, the magazine 10 is inserted through the magazine insertion hole with pushing the lid body 22 by the magazine 10. FIG. 12 is a section of the side surface of the library apparatus showing the initial condition where the magazine 10 is just inserted. The magazine 10 is slightly inserted. In response to this, the lid body 20 is depressed to pivot toward inside of the housing 21 about the shaft 22a. By further inserting the magazine 10, the lid body 22 is further pivoted to be positioned in substantially horizontally oriented position with directly the front surface upwardly. The magazine 10 moves with sliding on the front surface of the lid body 22 to contact with the engaging projection 24c as shown in FIG. 18. By abutting the front end of the magazine 10 onto the engaging projection 24c, further insertion of the magazine 10 becomes impossible. At this time, as shown in FIG. 18, the latch receiving portion 12a formed in the magazine 10 is positioned below the hooking claw portion 45 of the hand device 40 in the loading and unloading HP.

Figure 13:
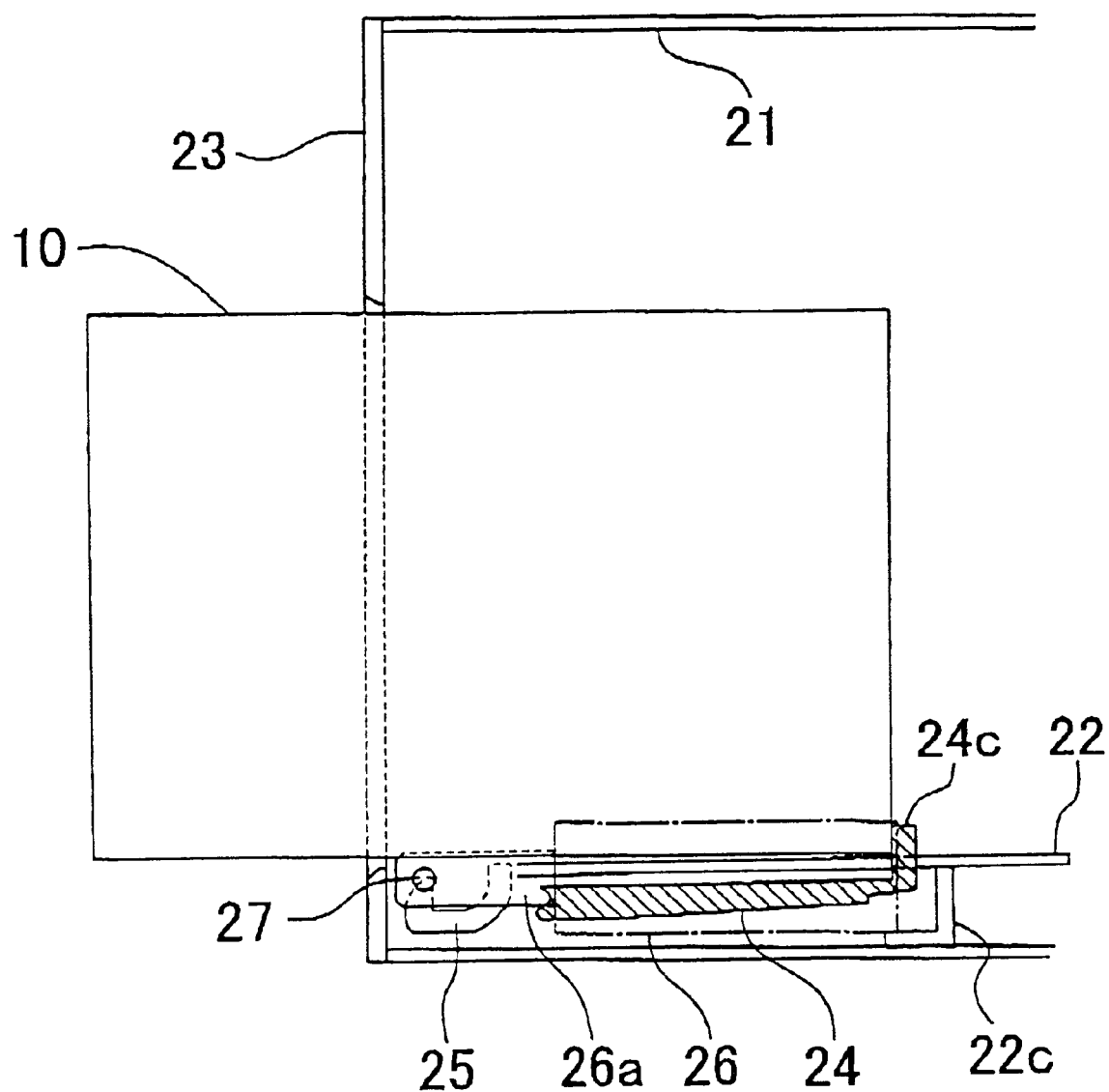
FIG. 13 is a partly sectioned right side elevation of the front portion of the library apparatus for explaining operation of the lid body upon insertion of a magazine, showing a condition where the inserted magazine is positioned by engaging with positioning means.
Figure 14:
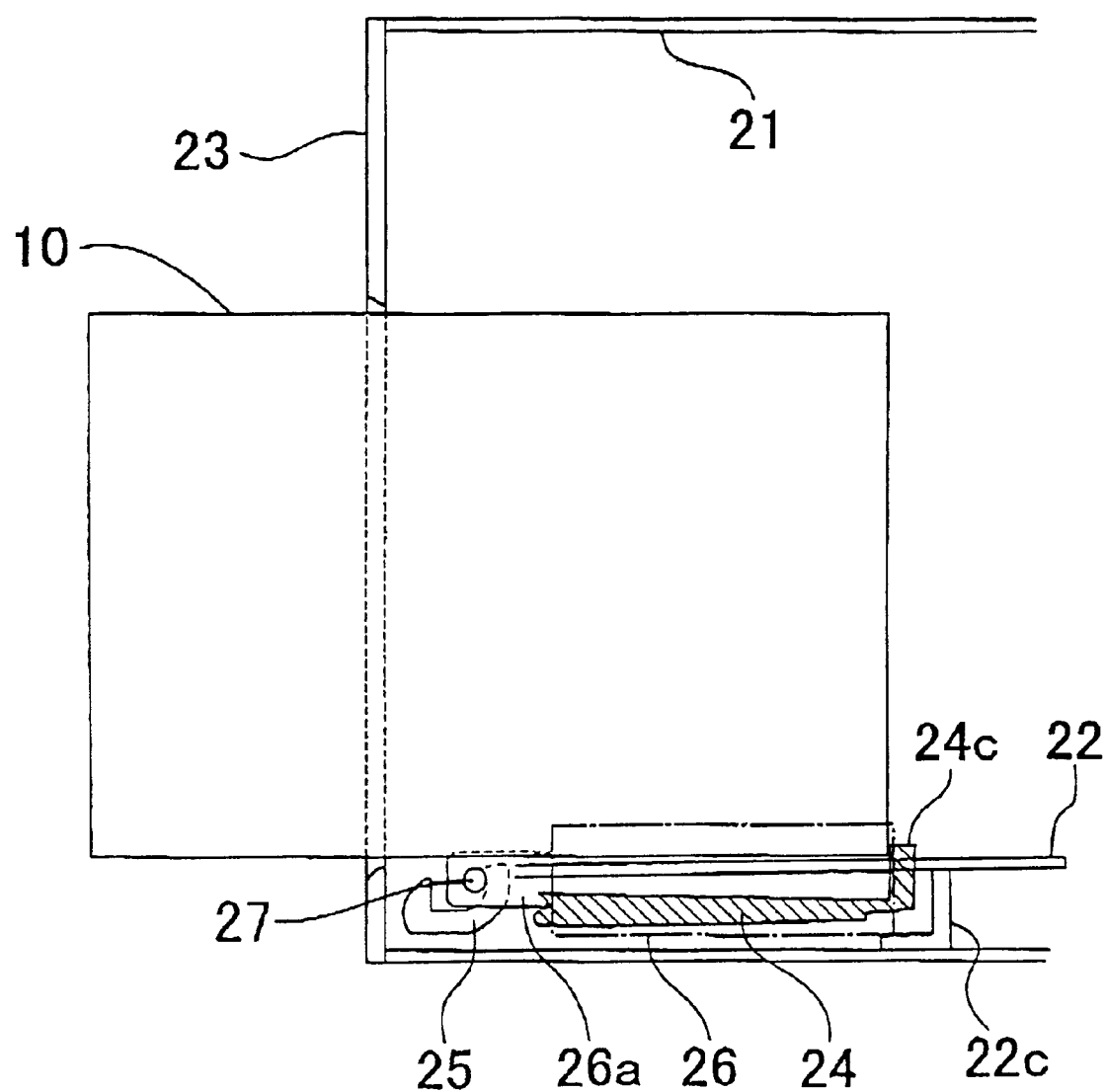
FIG. 14 is a partly sectioned right side elevation of the front portion of the library apparatus for explaining operation of the lid body upon insertion of a magazine, showing a condition where the lid body is closed.
Figure 15:
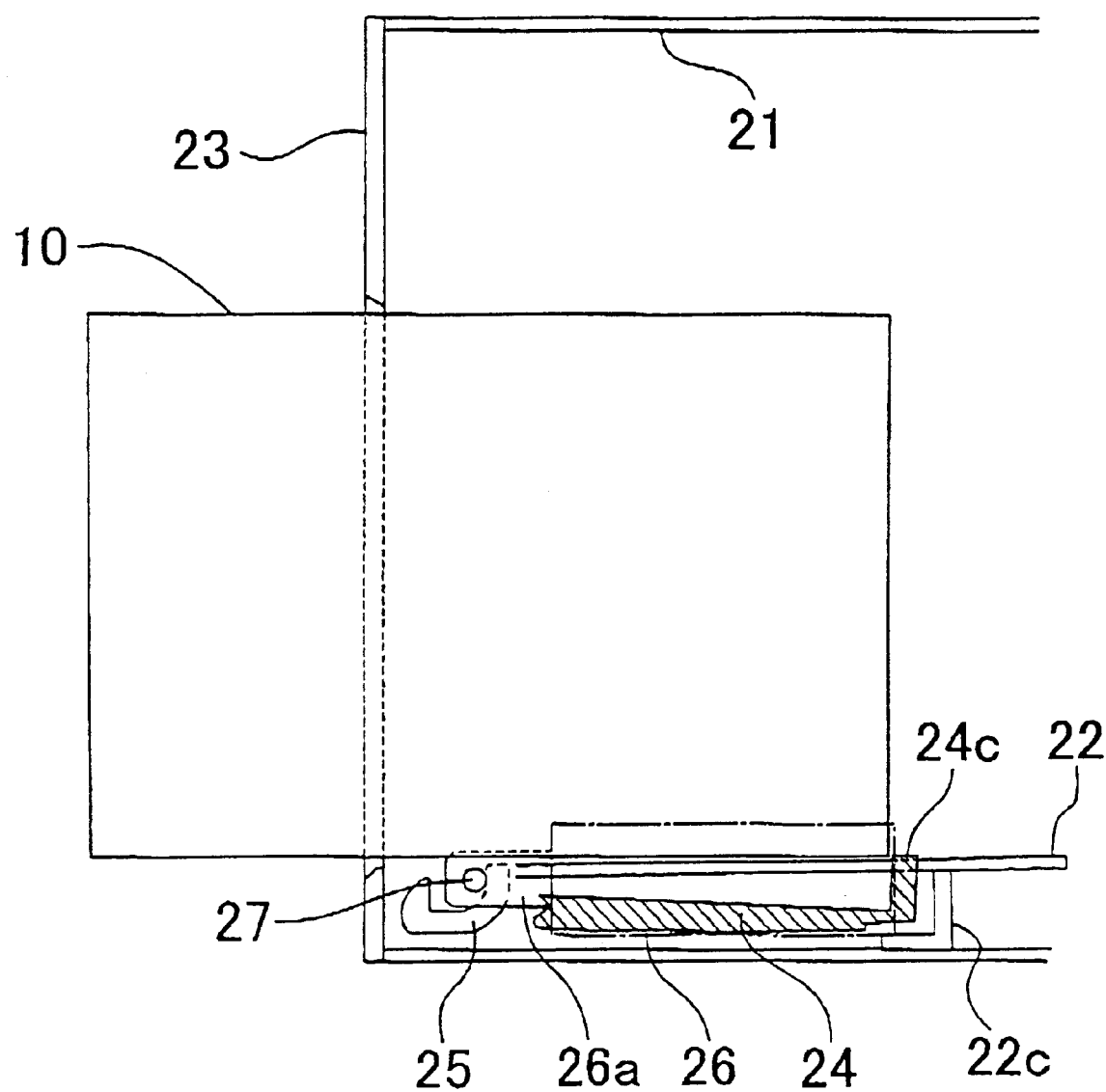
FIG. 15 is a partly sectioned right side elevation of the front portion of the library apparatus for explaining operation of the lid body upon insertion of a magazine, showing a condition where the positioning means positioned the magazine is released.
Figure 16:
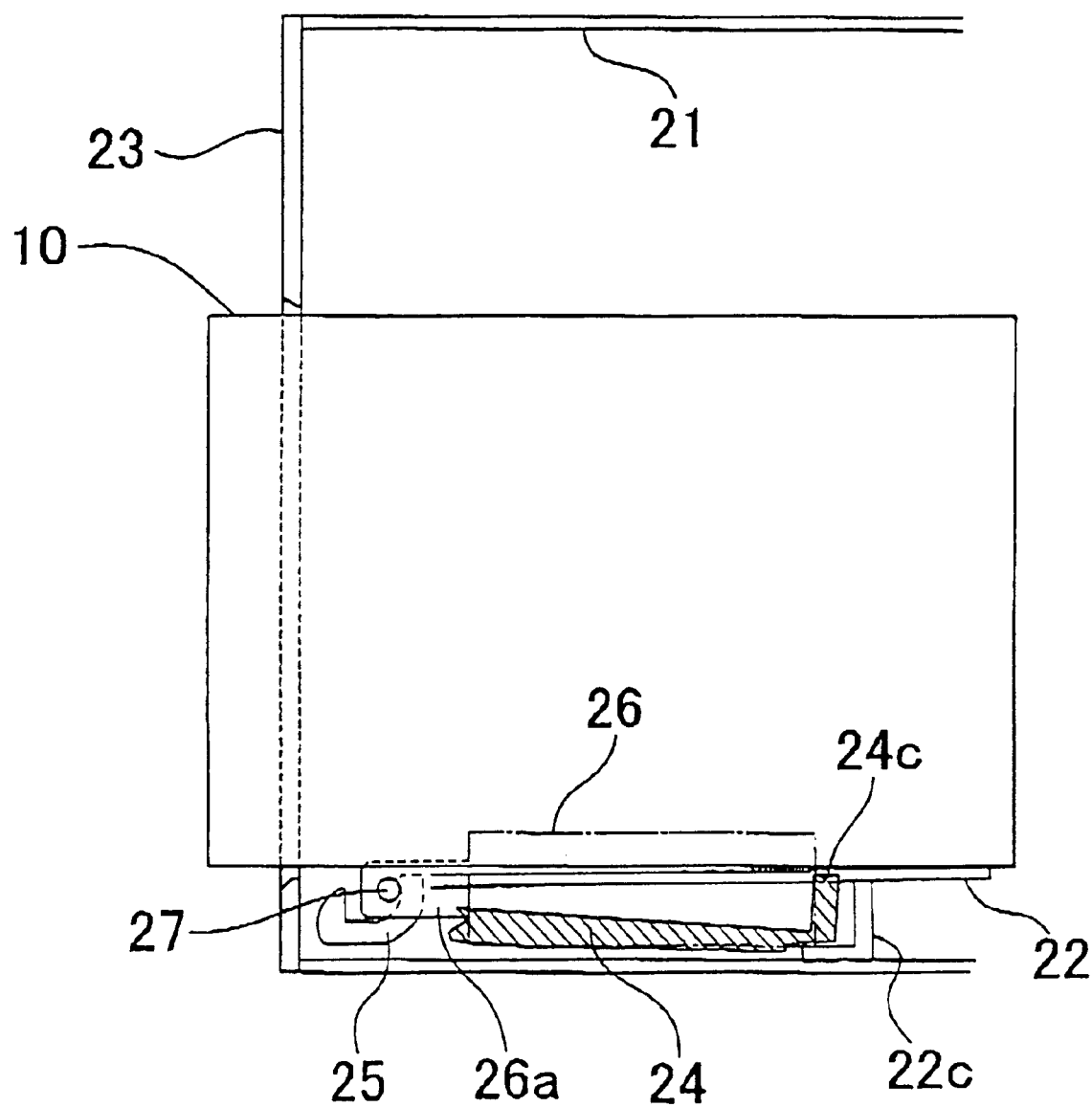
FIG. 16 is a partly sectioned right side elevation of the front portion of the library apparatus for explaining operation of the lid body upon insertion of a magazine, showing a condition where the magazine is further inserted from the position positioned by the positioning means.

When the magazine 10 at the position where the front end is abutted onto the engaging projection 24c, is detected by not shown position sensor for example, the magazine 10 is situated in the condition where insertion thereof is completed (step 3402/YES). Then, a signal indicative of insertion completion is output to the control portion 70. Then, the host computer 70a transmits the command for drawing the magazine 10 to CPU 72. CPU 72 transmits a drive signal for the solenoid driver 75. Then, the solenoid driver 75 actuates the solenoid 26 (step 3403). By this, the actuation rod 26a is retracted to cause pivotal movement of the engaging hook portion 25 about the shaft 22 which engages with the tip end of the actuation rod 26a, in clockwise direction in FIG. 13. Since the engaging hook portion 25 is formed on the lid body engaging plate 24, the lid body engaging plate 24 is pivoted in the same direction to cause releasing of engagement with the magazine 10 by withdrawing the engaging projection 24c from the engaging hole 22b.

On the other hand, CPU 72 transmits a drive signal to the motor driver to drive the shaft driving motor 35 (step 3403). By revolution of the shaft driving motor 35, the screw shaft 34 connected thereto is driven to rotate. Since the guide pin 36a is connected to the screw shaft 34, the guide pin 36a is driven vertically along the screw groove 34a. As a result, the picker device 32, on which the guide pin 36a is provided, is elevated.

Figure 19:
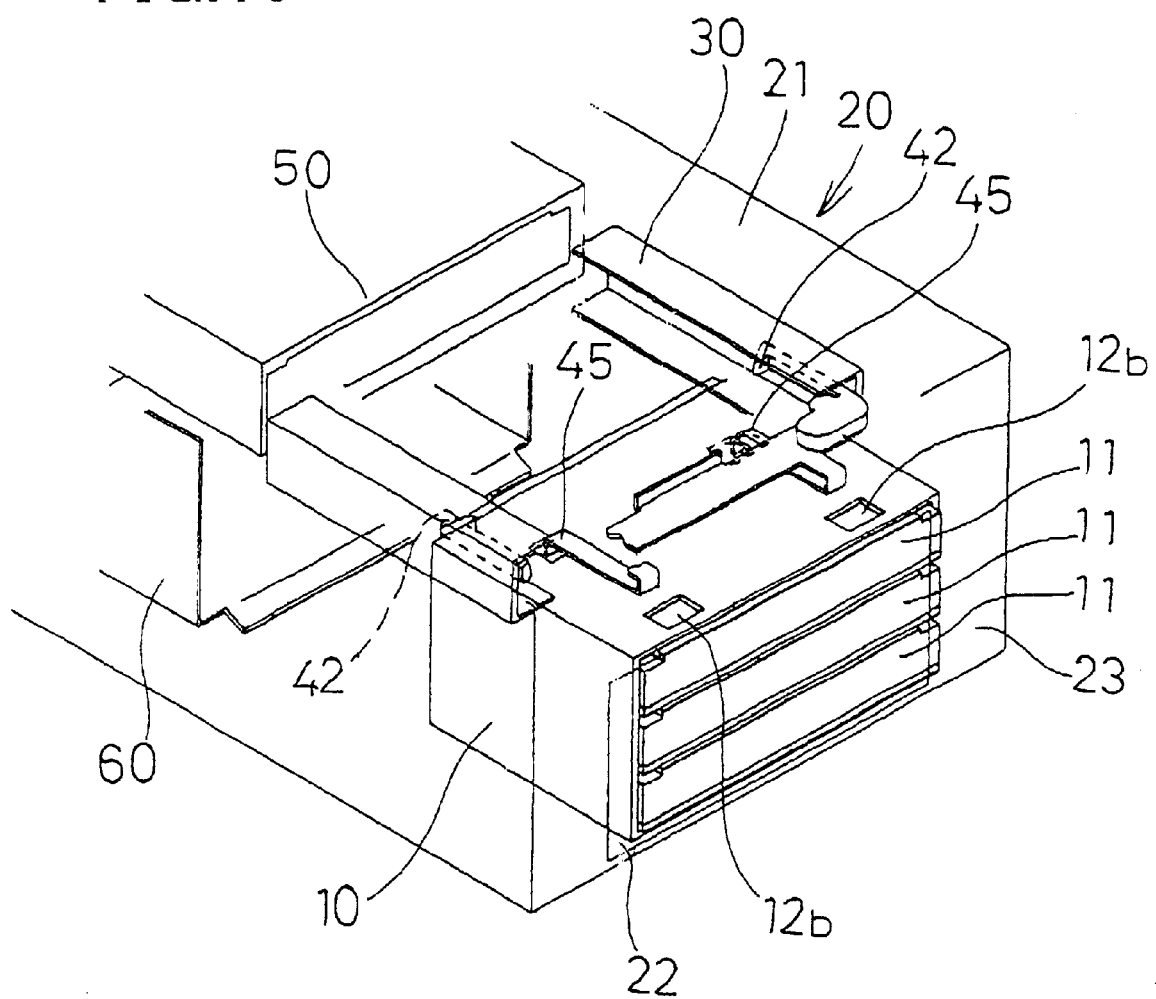
FIG. 19 is a perspective view of the front portion of the library apparatus illustrated with omitting a part of the library apparatus in order to explain operation upon loading the magazine in the library apparatus, which shows a condition immediately before moving the inserted magazine to the holder device.

It should be appreciated that the vertical direction of motion of the picker device 32 is variable depending upon rotating direction of the screw shaft 34. Upon loading the magazine 10, the picker device 32 located at the transportation HP is lowered. Namely, the shaft driving motor 35 is driven for revolution in the direction for lowering the picker device 32. This direction of revolution of the shaft driving motor 35 is hereinafter referred to as forward direction. When the picker device 32 is lowered, the hooking claw portion 45 provided in the hand plate 41 is inserted into the latch receiving portion 12a formed in the top plate of the magazine, as shown in FIG. 19. It should be noted that the position where the magazine is positioned by abutting onto the engaging projection 24c corresponds to the position where the engaging claw portion 45 and latch receiving portion 12a are engaged. Then, at the condition where the engaging claw portion 45 and the latch receiving portion 12a are engaged, the shaft driving motor 35 is stopped.

Figure 20:
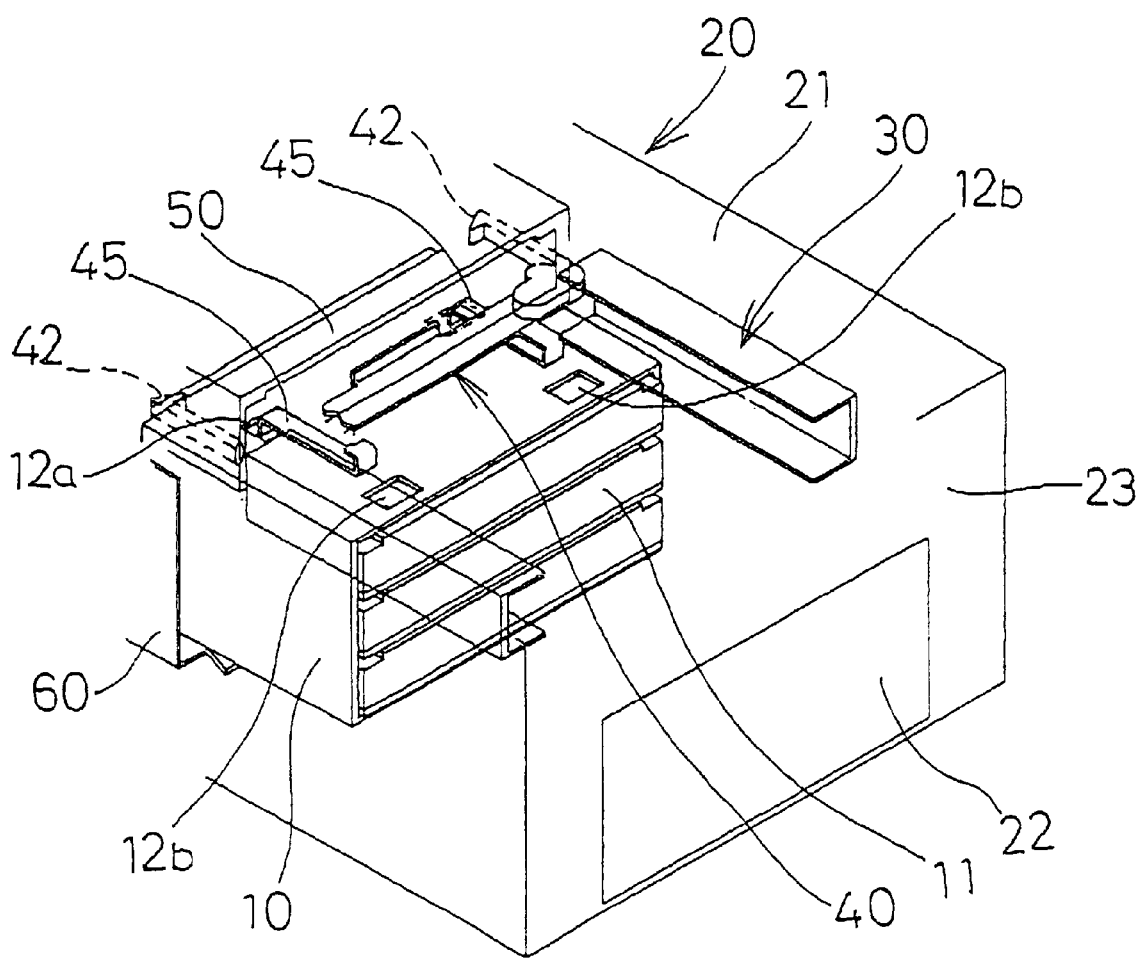
FIG. 20 is a perspective view of the front portion of the library apparatus illustrated with omitting a part of the library apparatus in order to explain operation upon loading the magazine in the library apparatus, which shows a condition where the magazine is inserted into the holder device at midway.

Once the engaging claw portion engages with the latch receiving portion 12a, CPU 72 feeds a drive signal to the hand drive motor 84 for actuation (step 3404). When the hand driving motor 84 is actuated to transmit rotational output thereto to the driving pulley 83a through the gear train 85, the driving belt 83 stretched between the driving pulley 83a and the driving pulley 83b is driven to circulate. Since the hand plate 41 is engaged with the drive belt 83, the hand plate 41 is also shifted according to circulation of the drive belt 83. Shifting direction of the hand plate 41 is variable depending upon the direction of revolution of the hand driving motor 84. Upon loading the magazine 10, the hand plate 41 is retracted inside of the library apparatus 20. It should be noted that the driving direction of the hand driving motor 84 in this case is hereinafter referred to as forward direction. When the hand plate 41 is retracted, the magazine, the latching receiving portion thereof being in engagement with the hooking claw portion 45, is then drawn toward the magazine holder 60. This condition is shown in FIG. 20.

At this time, if the magazine 10 can be received within the magazine holder 60 at one time of retracting action of the hand plate 41, loading of the magazine 10 can be completed. However, since the shifting operation of the hand plate 41 is for transferring the cartridge 11 in the loaded magazine 10 to the media drive device 50, it is only required a stroke sufficient for withdrawing the cartridge 11 from the magazine 10 and inserting the cartridge into the medium drive device 50. In contrast to this, since the magazine 10 is designed to receive the cartridges therein and is greater than the cartridge in certain extent, and also, a part of the magazine 10 is required to be projected from the magazine insertion opening of the library device upon loading and unloading the magazine 10. Therefore, the shifting distance of the magazine upon loading the magazine 10 within the magazine holder 60 should be greater than the stroke required for withdrawing and inserting the cartridge from and into the magazine. Accordingly, retracting operation of the hand plate at one time should be insufficient for completing loading operation of the magazine 10.

Figure 21:
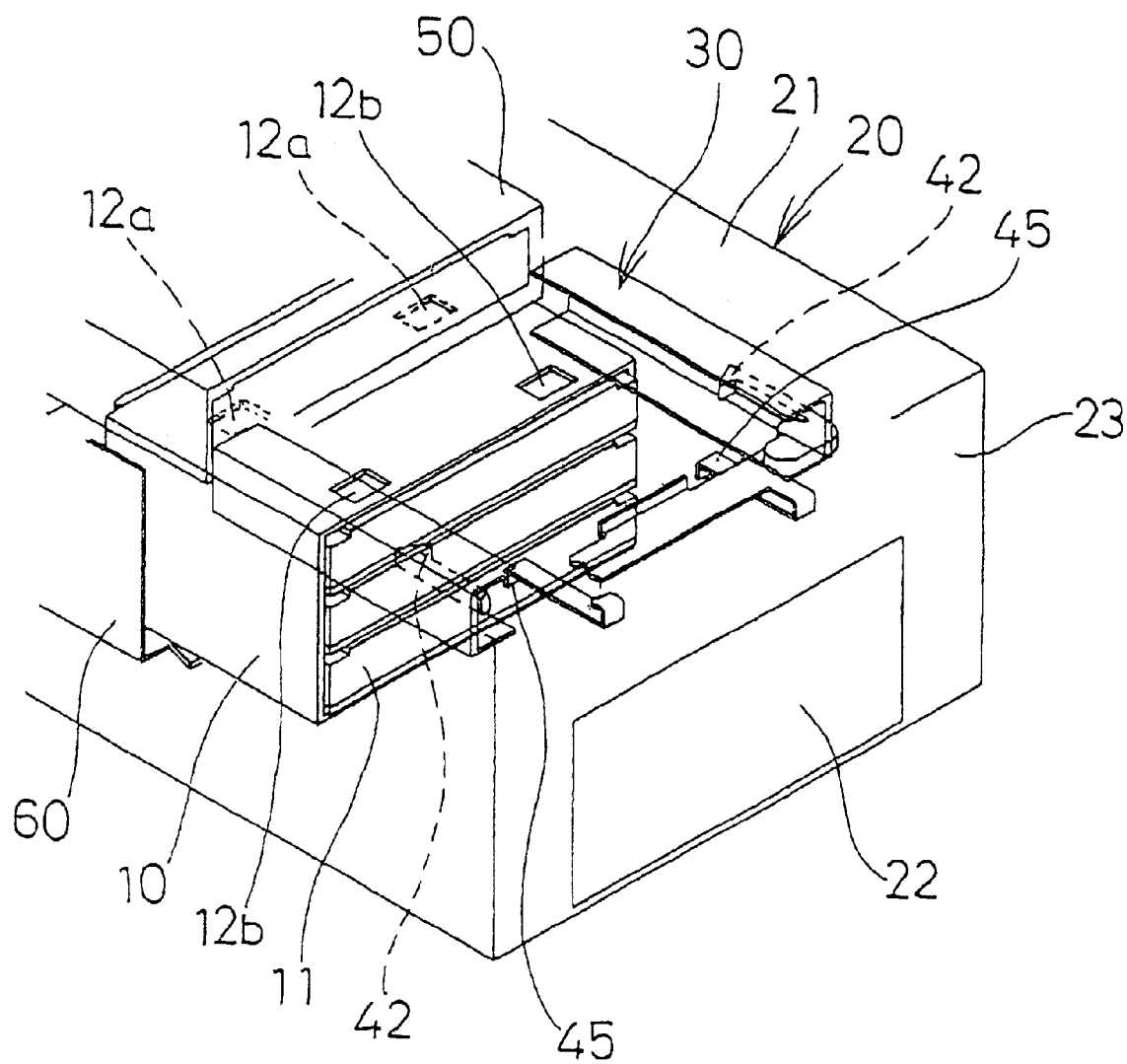
FIG. 21 is a perspective view of the front portion of the library apparatus illustrated with omitting a part of the library apparatus in order to explain operation upon loading the magazine in the library apparatus, which shows a condition immediately before loading of magazine to the holder device.
Figure 22:
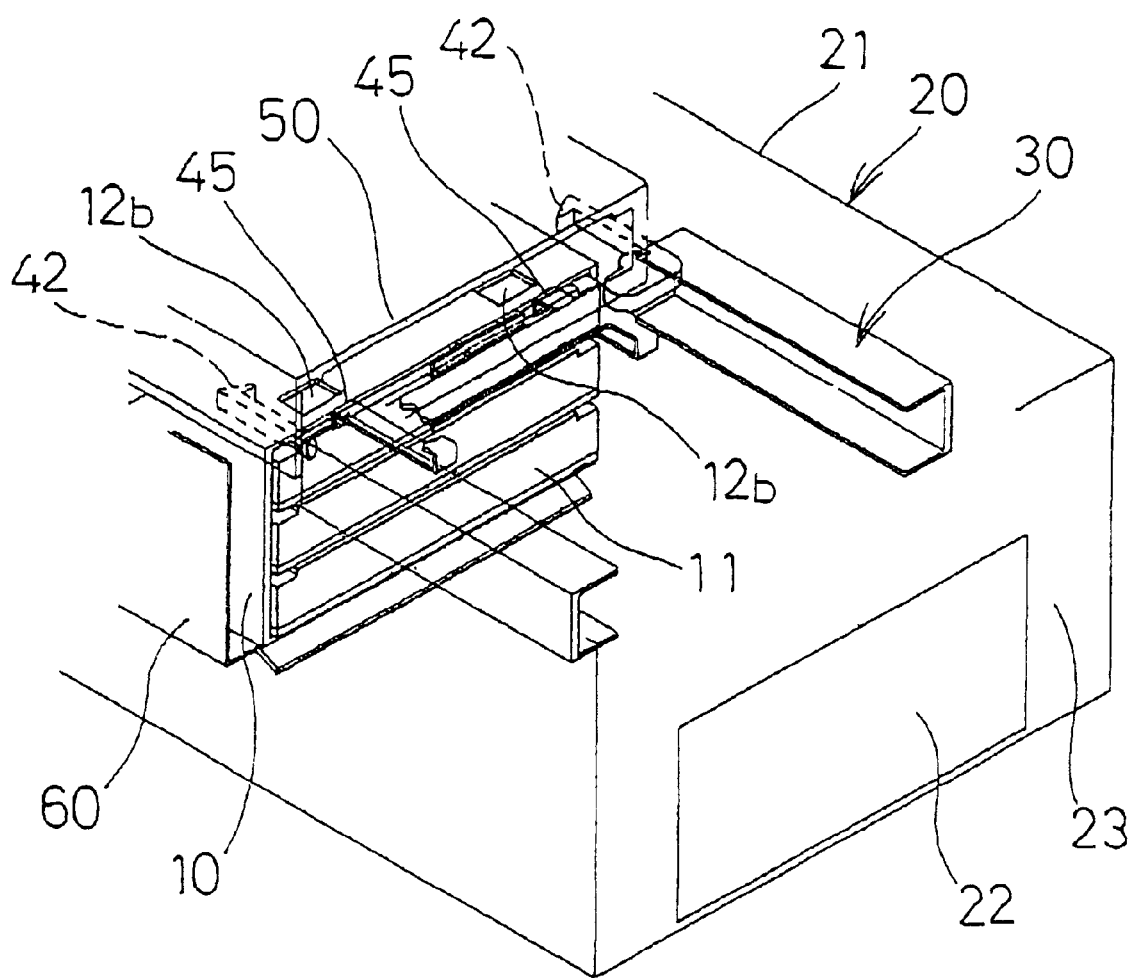
FIG. 22 is a perspective view of the front portion of the library apparatus illustrated with omitting a part of the library apparatus in order to explain operation upon loading the magazine in the library apparatus, which shows a condition where the magazine is loaded in the holder device.

Therefore, once the hand driving motor 84 is driven to the maximum retracting stroke of the hand plate 41, the hand driving motor 84 is stopped. Then, the shaft drive motor 35 is driven in reverse direction to elevate the picker device 32 to the transportation HP (step 3405). By upward movement of the picker device 32, the hooking claw portion 45 is released from the latch receiving portion 12a of the magazine. Then, the hand driving motor 84 is driven in reverse direction to extract the hand plate 41 to the loading and unloading HP (step 3406). Subsequently, the shaft driving portion 35 is driven in forward direction to lower the picker device 32. Then, as shown in FIG. 21, the hooking claw portion 45 is located at front side beyond the front face of the magazine 10 (step 3407). As lowered down to the predetermined position, the shaft driving motor 35 is stopped. Then, the hand driving motor 8s is driven in forward direction. By driving the hand driving motor 84 in forward direction, the hand plate 41 is again retracted to abut the hooking claw portion 45 with the front face of the magazine to push the magazine 10. Therefore, the magazine 10 is fed inner side of the library apparatus to be received in the magazine holder 60 as shown in FIG. 22 (step 3408).

Once it is confirmed that the magazine 10 is received within the magazine holder 60 and is locked therein so as not to be easily released therefrom (step 3409/Yes), the solenoid 26 is stopped (step 3411). By stopping actuation of the solenoid 26, the actuation rod 26a becomes free to constraint by the engaging hook portion 25 to make the lid body engaging plate 24 free. Therefore, the lid body engaging plate 24 is biased toward the lid body 22 by the restoring force of the return spring 28 to pivot the lid body into the closed position. Once the lid body 22 is closed, a sequence of magazine loading operation to the library apparatus 20 is completed (step 4310).

Once loading of the magazine 10 is completed, the picker device 32 is moved to the transportation HP and the hand device 40 is moved to the loading and unloading HP to wait for command from the host computer 70a. When the command is received from the host computer 70a, the picker device 32 is lowered to the position where the cartridge 11 in the magazine 10 loaded in the magazine holder 60 can be withdrawn. Then, the hand plate 41 is driven to retract so that the hand may grip the cartridge 11. Then, by driving the hand plate 41 frontwardly, the cartridge 11 is withdrawn from the magazine 10 to transfer to the picker device 32.

Then, the picker device 32 is lowered to place the cartridge 11 held by the picker device 32 at a position to insert into the media drive device 50. Then, the hand plate 41 is retracted to load the cartridge in the media drive device 50. Subsequently, by driving the hand plate to the loading and unloading HP, the cartridge 11 is placed in a position loaded in the medium drive device 50. The medium drive device 50 can read and write information for the storage medium received in the cartridge 11.

In order to exchange the cartridge 11, the hand plate 41 is retracted to grip the cartridge loaded in the medium drive device 50. Then, the hand plate 41 is driven frontwardly to withdraw the cartridge 11 from the medium drive device 50 to return to the space within the magazine. Thereafter, the next cartridge 11 to be loaded in the medium drive device 50 is withdrawn from the magazine 10 to transport to the medium drive device 50. It should be noted that for gripping operation of the cartridge 11 by the hand 42, known loading and unloading mechanisms can be employed.

Figure 27:
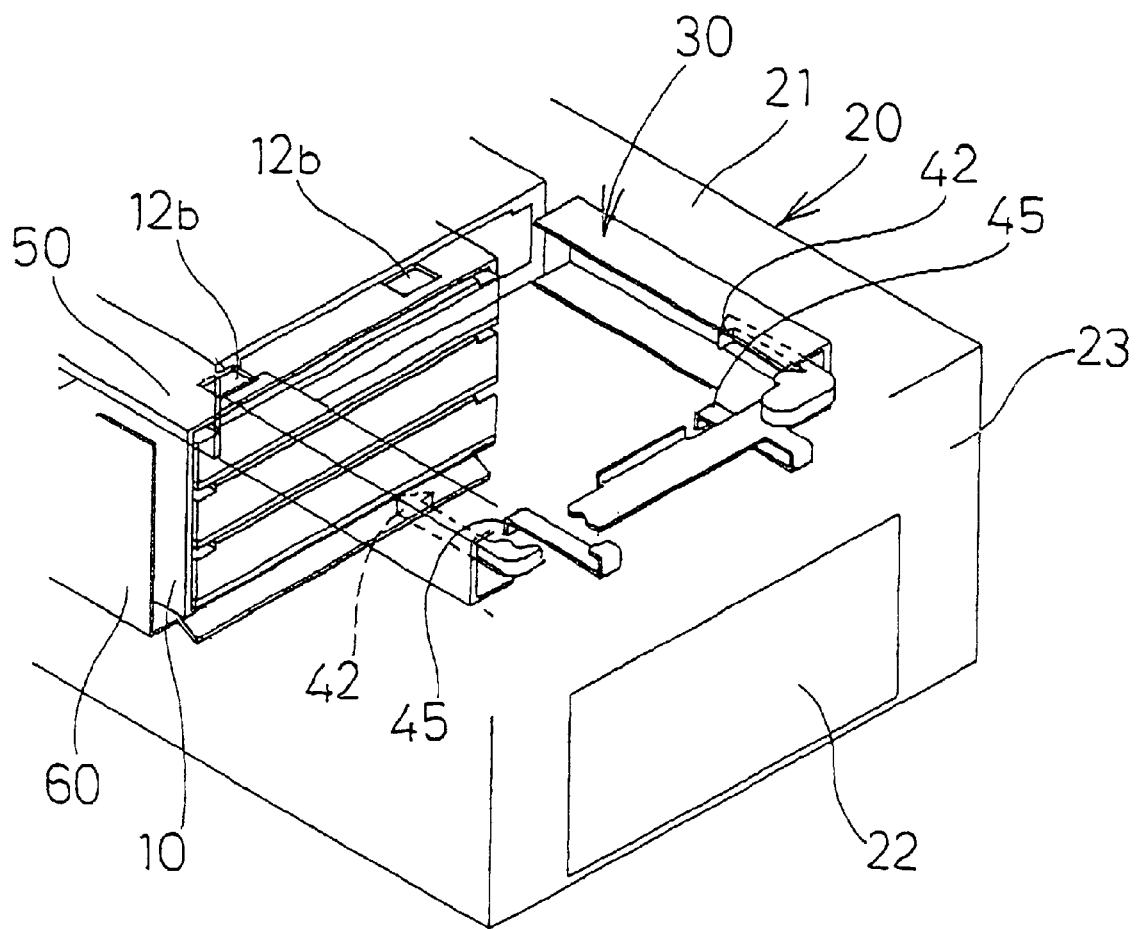
FIG. 27 is a partly sectioned perspective view of the front portion of the library showing the library apparatus with omitting a part in order to explain operation upon ejecting the magazine from the library apparatus, which shows a condition where the magazine is loaded in the holder device.
Figure 35:
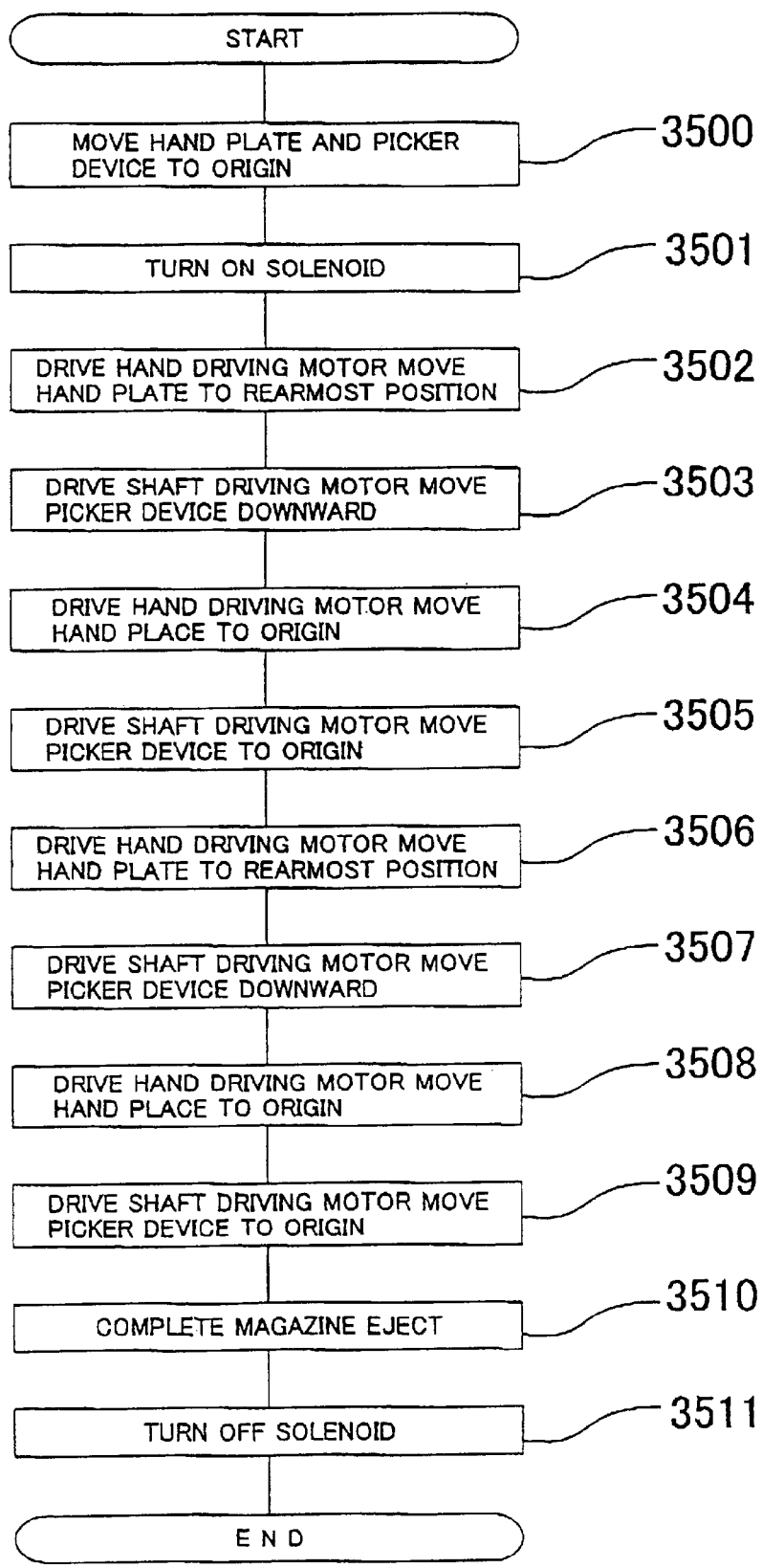
FIG. 35 is a flowchart for showing the case where the magazine is ejected from the library apparatus.
Figure 36:
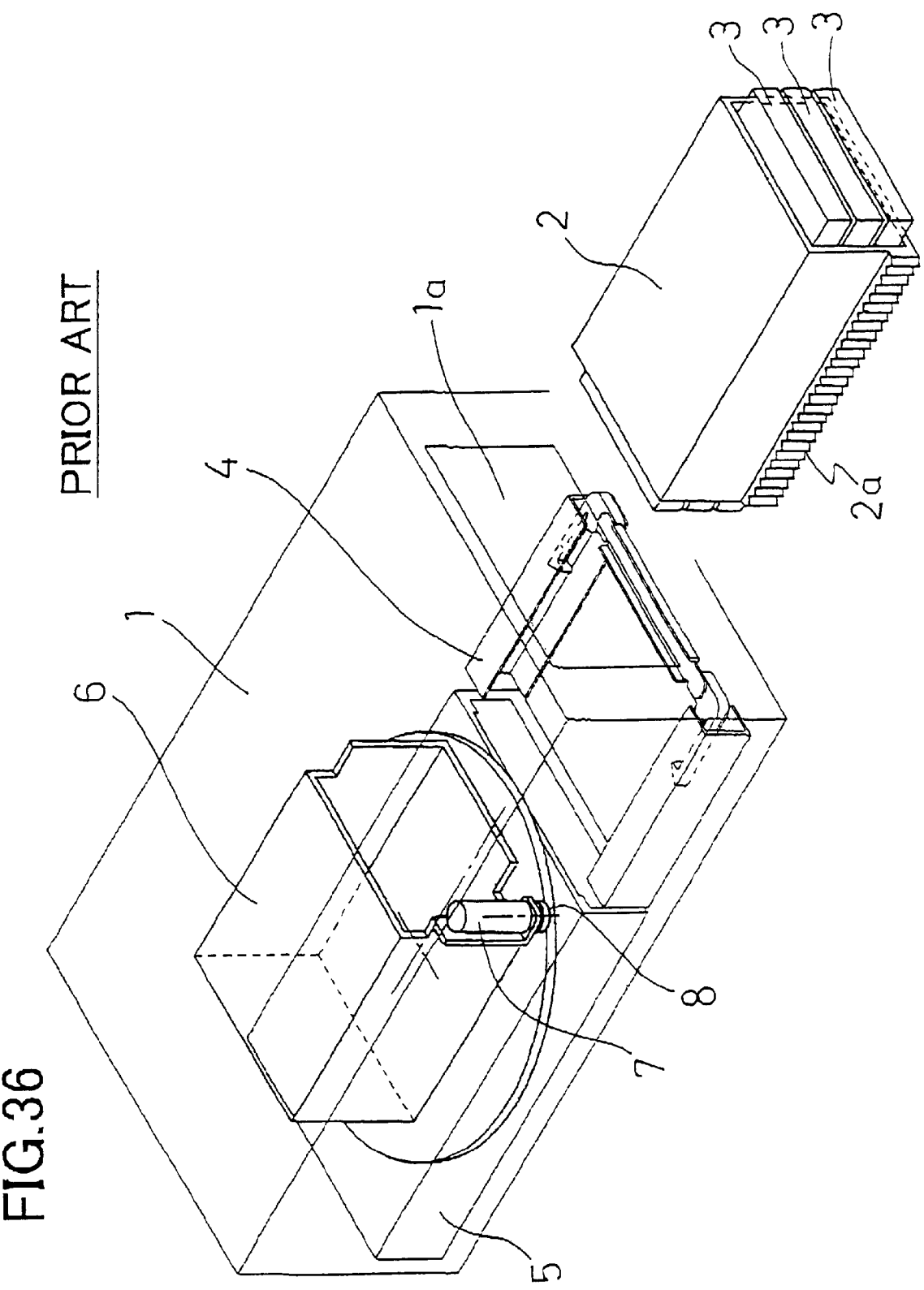
FIG. 36 is a perspective view for explaining a structure of the conventional library apparatus.

FIG. 35 is a flowchart showing the case where the magazine 10 is ejected from the library apparatus 20. When a command for ejecting the magazine 10 is issued from the host computer 70a, drive signals are fed from CPU 72 to the motor drivers 73 and 74 to actuate the shaft driving motor 35 and the hand driving motor 84. Then, as shown in FIG. 27, the picker device 32 is placed at the transportation HP and the hand device 40 is loading and unloading HP (step 3500). On the other hand, by feeding the drive signal from CPU 72 to the solenoid driver 75, the solenoid 26 is actuated to retract the actuation rod 26a to open the lid body (step 3501).

Figure 23:
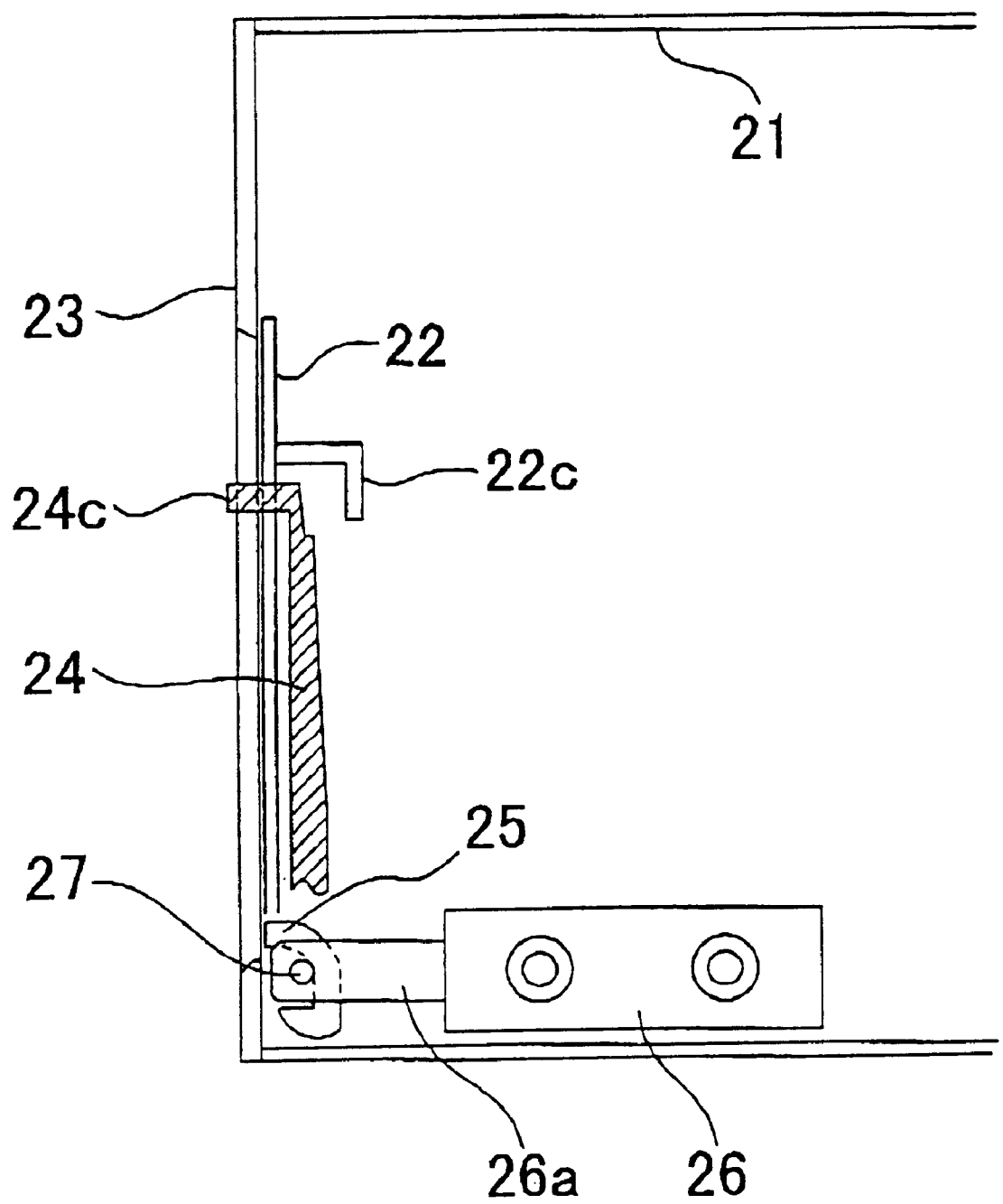
FIG. 23 is a partly sectioned right side elevation of the front portion of the library apparatus for explaining operation upon opening the lid body, which shows a condition where the lid body is closed.
Figure 24:
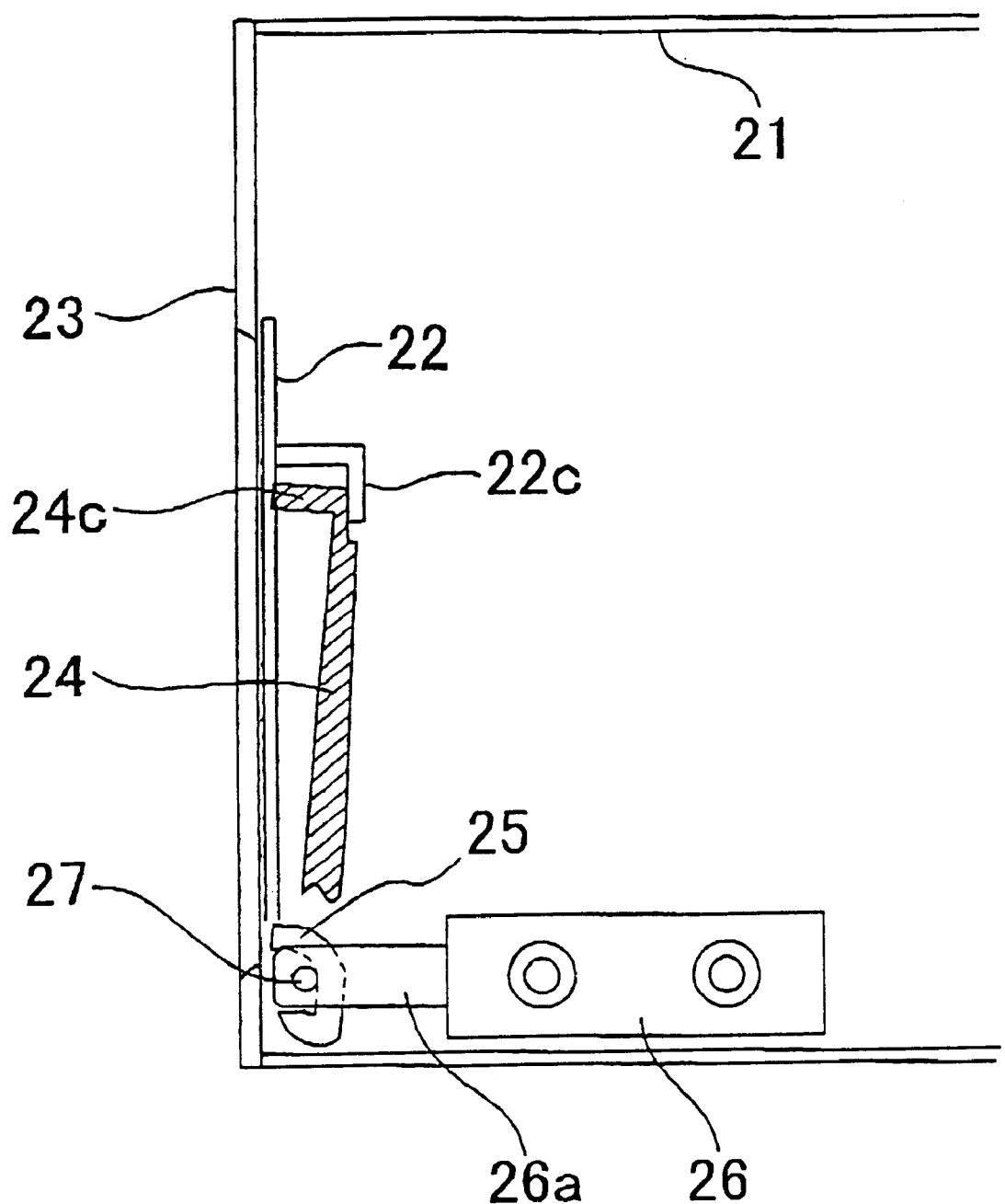
FIG. 24 is a partly sectioned right side elevation of the front portion of the library apparatus for explaining operation upon opening the lid body, which shows a condition where a solenoid initiates actuation for opening the lid body.
Figure 25:
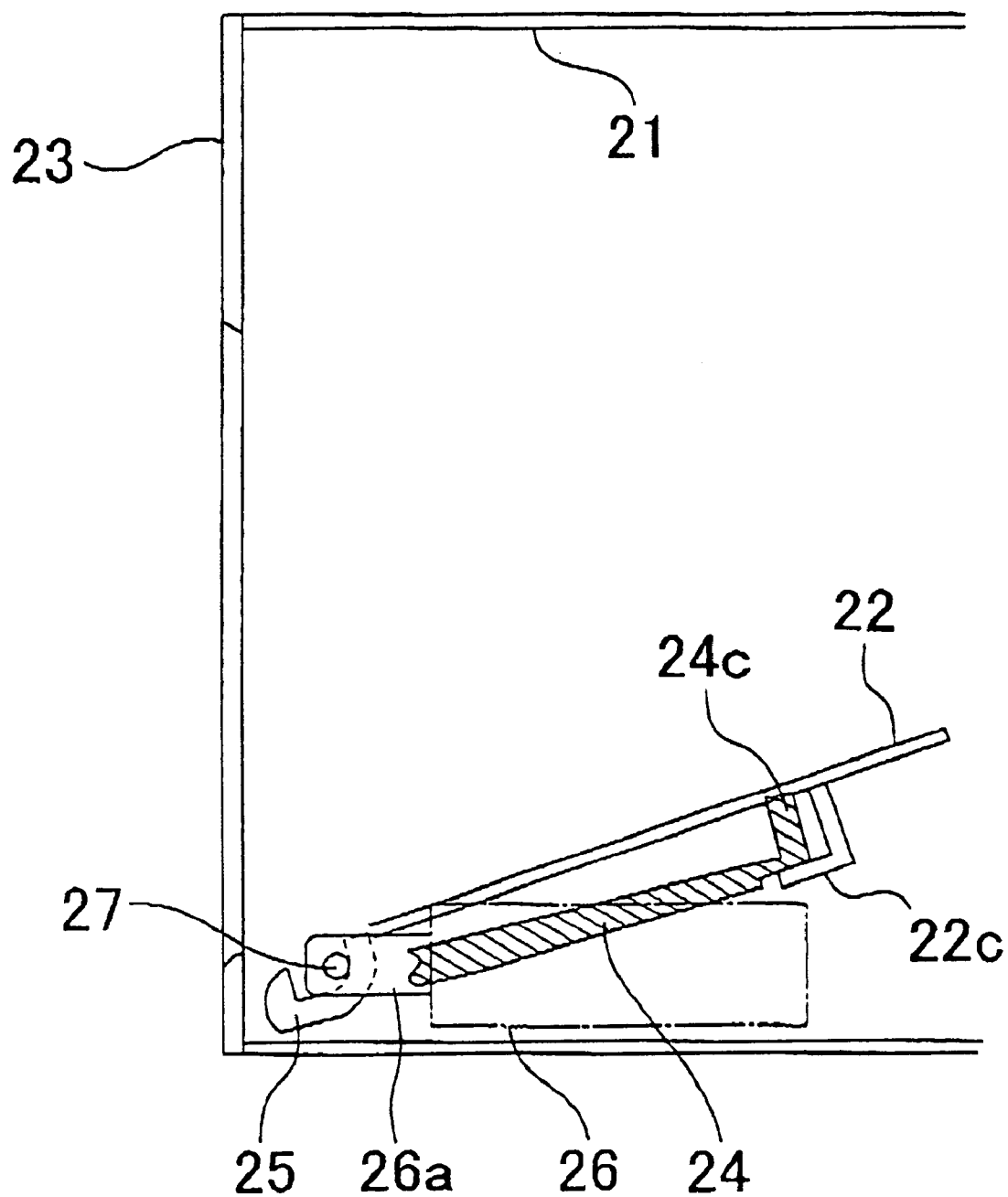
FIG. 25 is a partly sectioned right side elevation of the front portion of the library apparatus for explaining operation upon opening the lid body, which shows a condition where the lid body is opened at midway.
Figure 26:
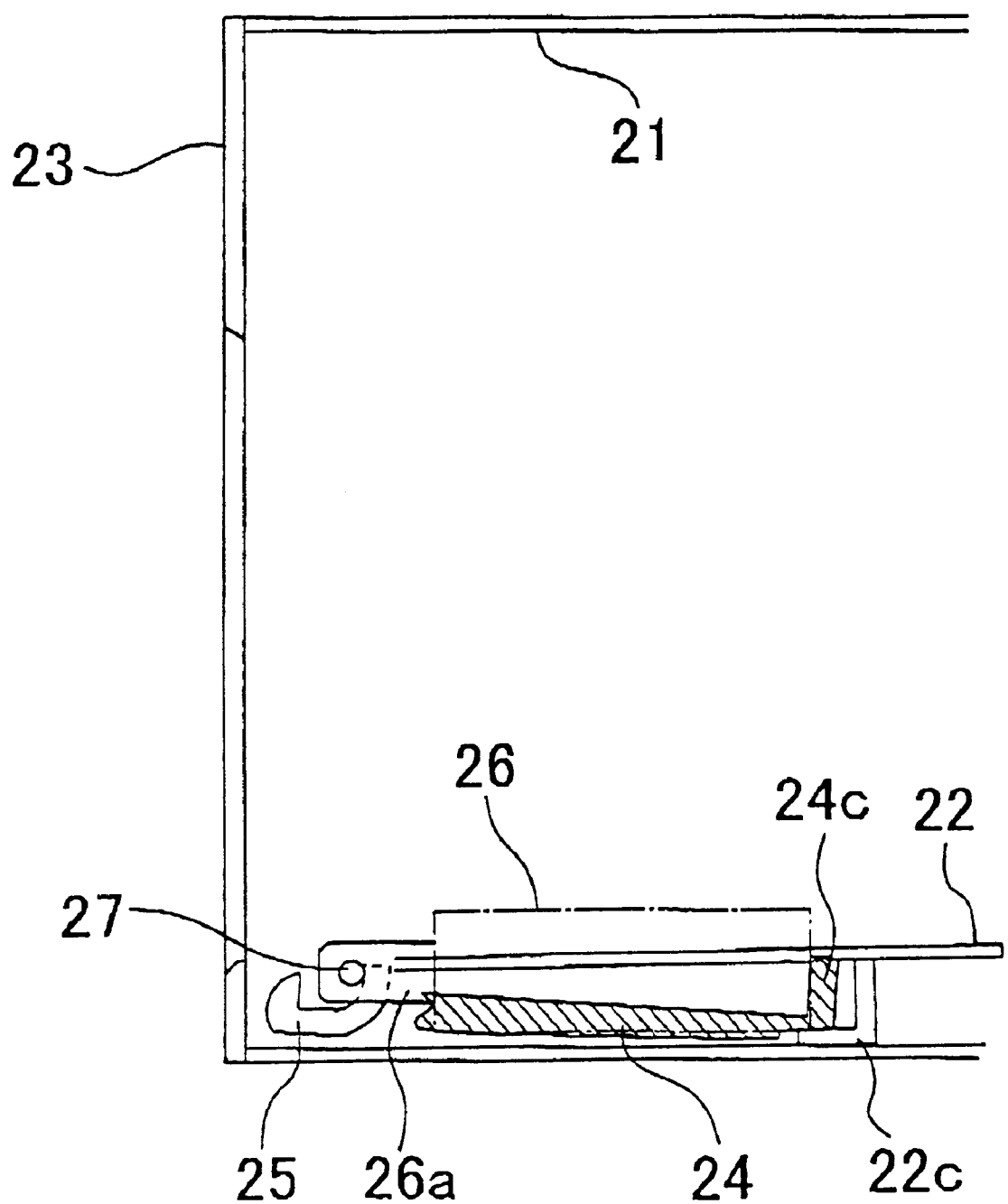
FIG. 26 is a partly sectioned right side elevation of the front portion of the library apparatus for explaining operation upon opening the lid body, which shows a condition where the lid body is opened.

FIG. 23 shows a condition where the lid body 22 is closed. At this condition, when the actuation rod 26a of the solenoids 26 is retracted to cause pivotal motion of the engaging hook portion 25. Then, the lid body engaging plate 24 is pivoted in clockwise direction in FIG. 23. By this pivotal motion, as shown in FIG. 24, the back surface of the action arm 24b of the lid body engaging plate 24 contacts with the hook portion 22c formed on the back surface of the lid body 22. Therefore, as shown in FIG. 25, the lid body 22 is pivoted in the same direction as pivoting direction of the lid body engaging plate 24 to open the lid body 22. Then, when the lid body 22 is pivoted to the position as being oriented in substantially horizontal direction as shown in FIG. 26, it becomes possible to eject the magazine. It should be noted that the engaging projection 24c of the lid body engaging plate 24 is drawn below the lid body 22 to as not to interfere ejection of the magazine 10.

Figure 28:
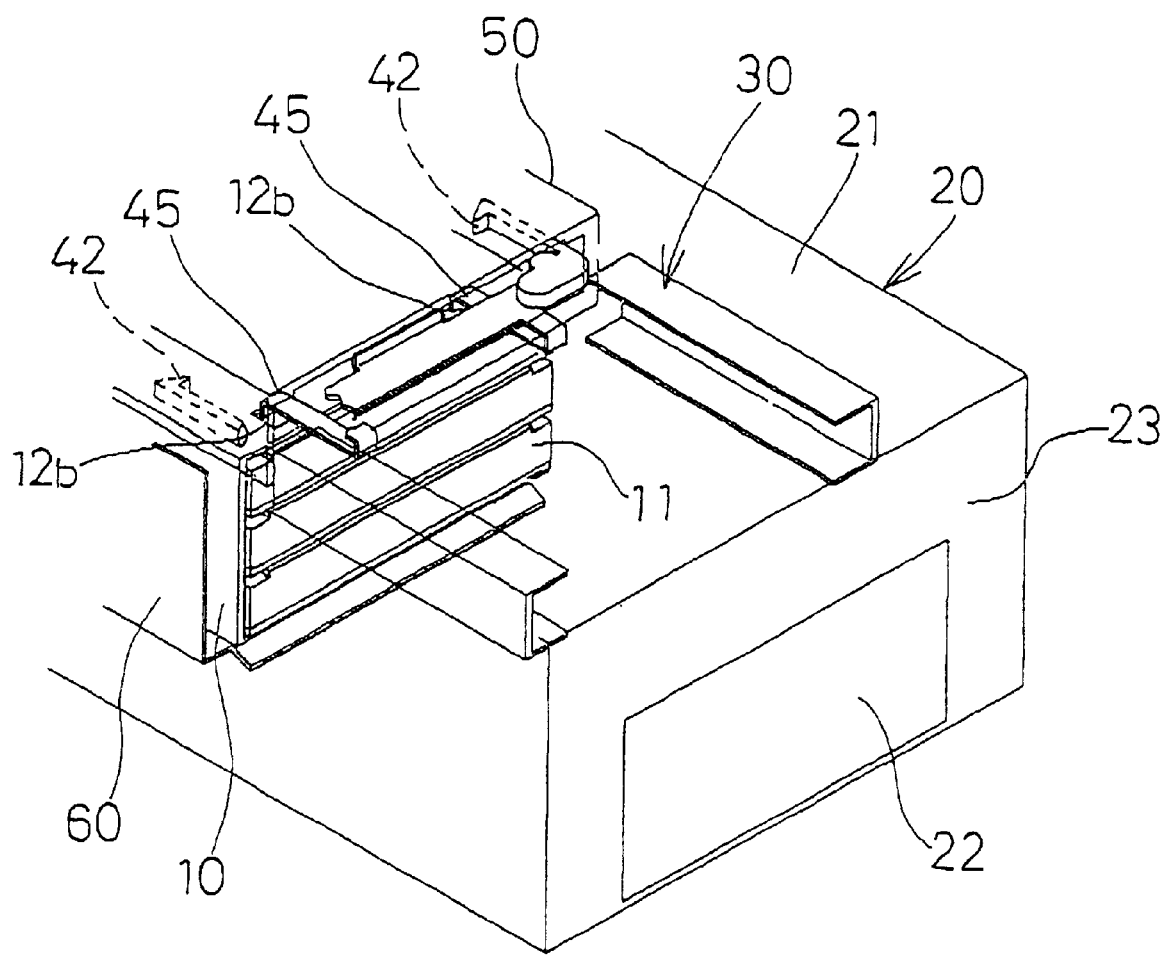
FIG. 28 is a partly sectioned perspective view of the front portion of the library showing the library apparatus with omitting a part in order to explain operation upon ejecting the magazine from the library apparatus, which shows a condition immediately before engaging latching means with latch receiving means of the magazine.
Figure 29:
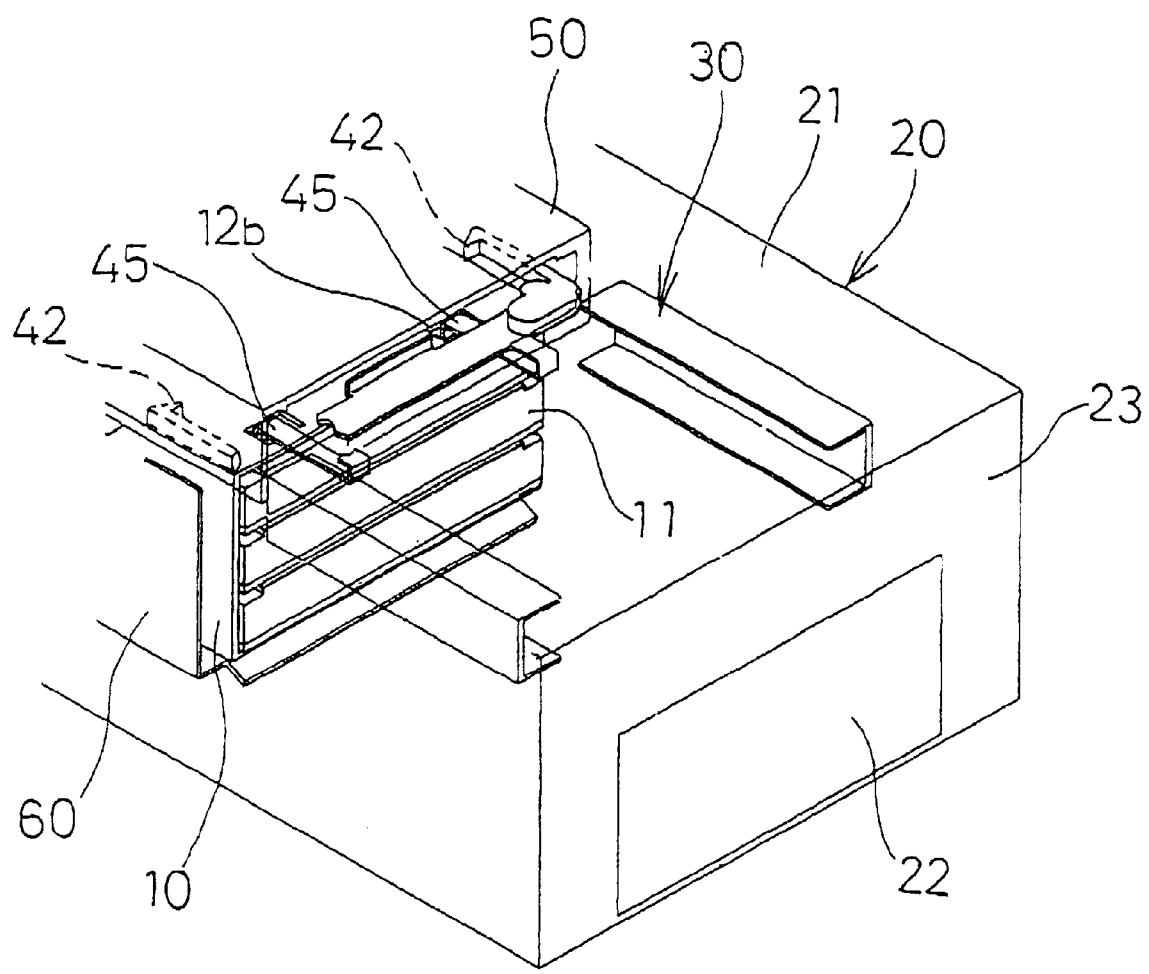
FIG. 29 is a partly sectioned perspective view of the front portion of the library showing the library apparatus with omitting a part in order to explain operation upon ejecting the magazine from the library apparatus, which shows a condition where the latching means is engaged with the latch receiving means of the magazine.

Next, the hand driving motor 84 is driven in forward direction. Then, as shown in FIG. 28, the hand device 40 is retracted up top the rearmost position (step 3502). Associating with retracting of the hand device 40, the hooking claw portion 45 is also retracted to be placed above the latch receiving portion 12b of the magazine 10. At this condition, the shaft driving motor 35 is driven in forward direction, the picker device 32 is lowered (step 3503). As shown in FIG. 29, the hooking claw portion 45 is inserted into the latch receiving portion 12b to engage therewith.

Figure 30:
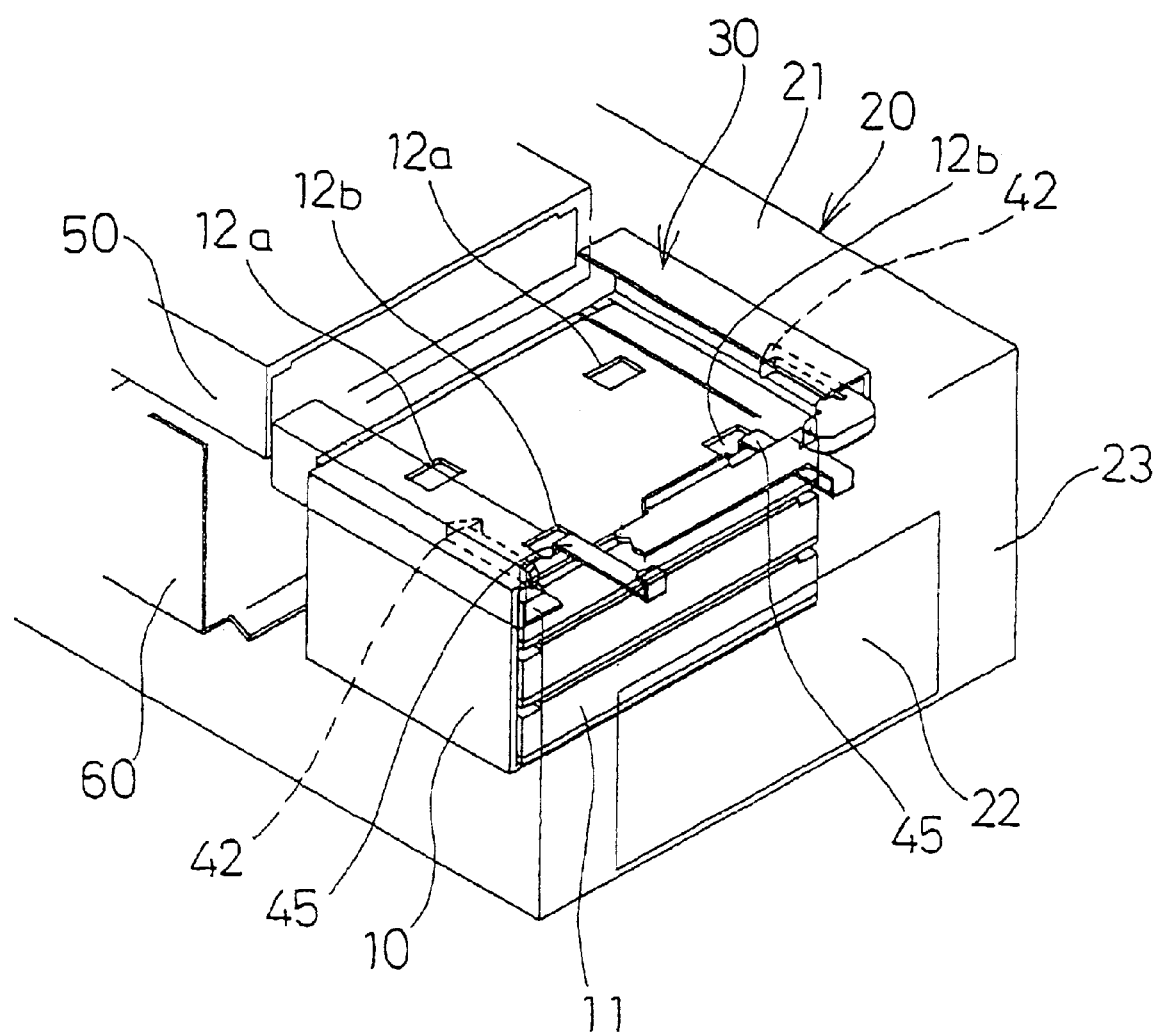
FIG. 30 is a partly sectioned perspective view of the front portion of the library showing the library apparatus with omitting a part in order to explain operation upon ejecting the magazine from the library apparatus, which shows a condition where the magazine is withdrawn from the holder device.
Figure 31:
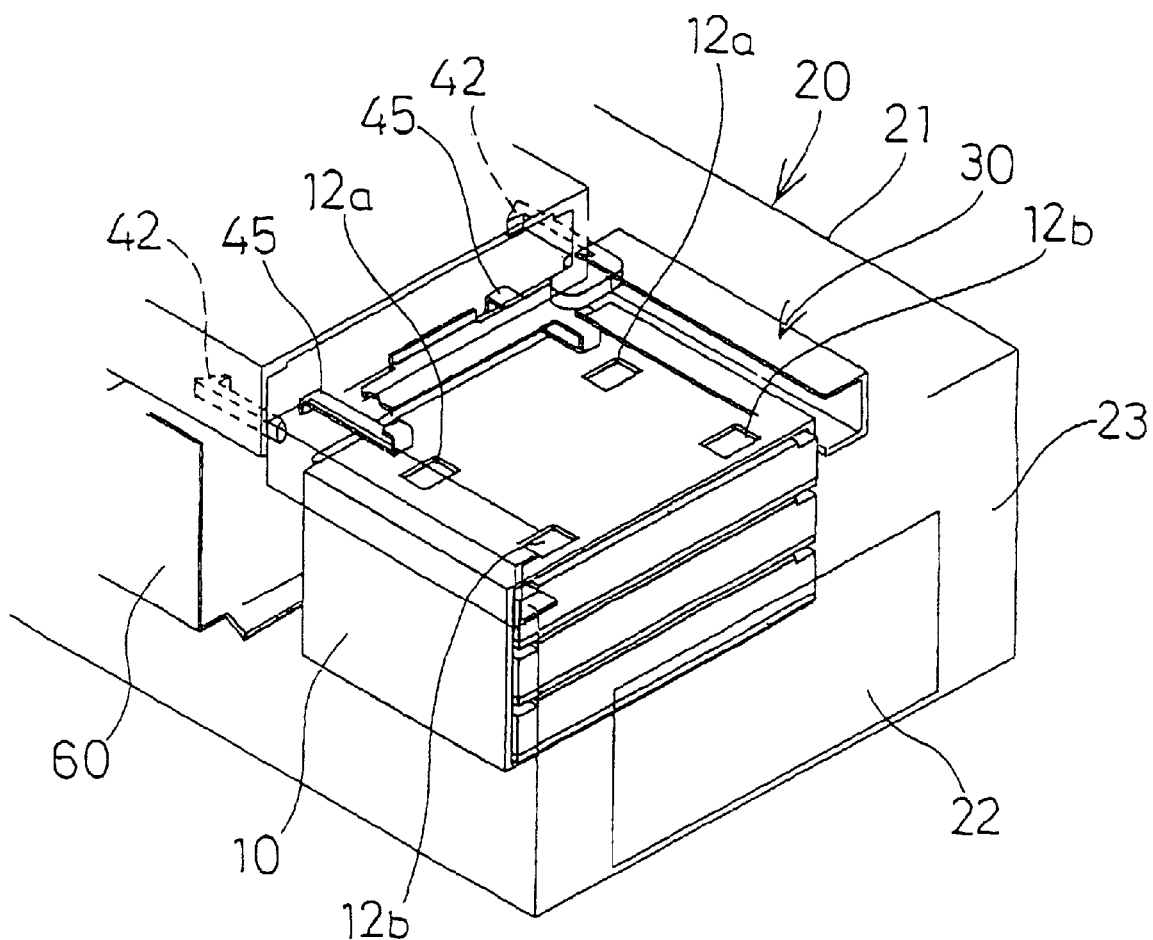
FIG. 31 is a partly sectioned perspective view of the front portion of the library showing the library apparatus with omitting a part in order to explain operation upon ejecting the magazine from the library apparatus, which shows a condition where the latch receiving means of the magazine withdrawn to the midway is engaged with the latching means.
Figure 32:
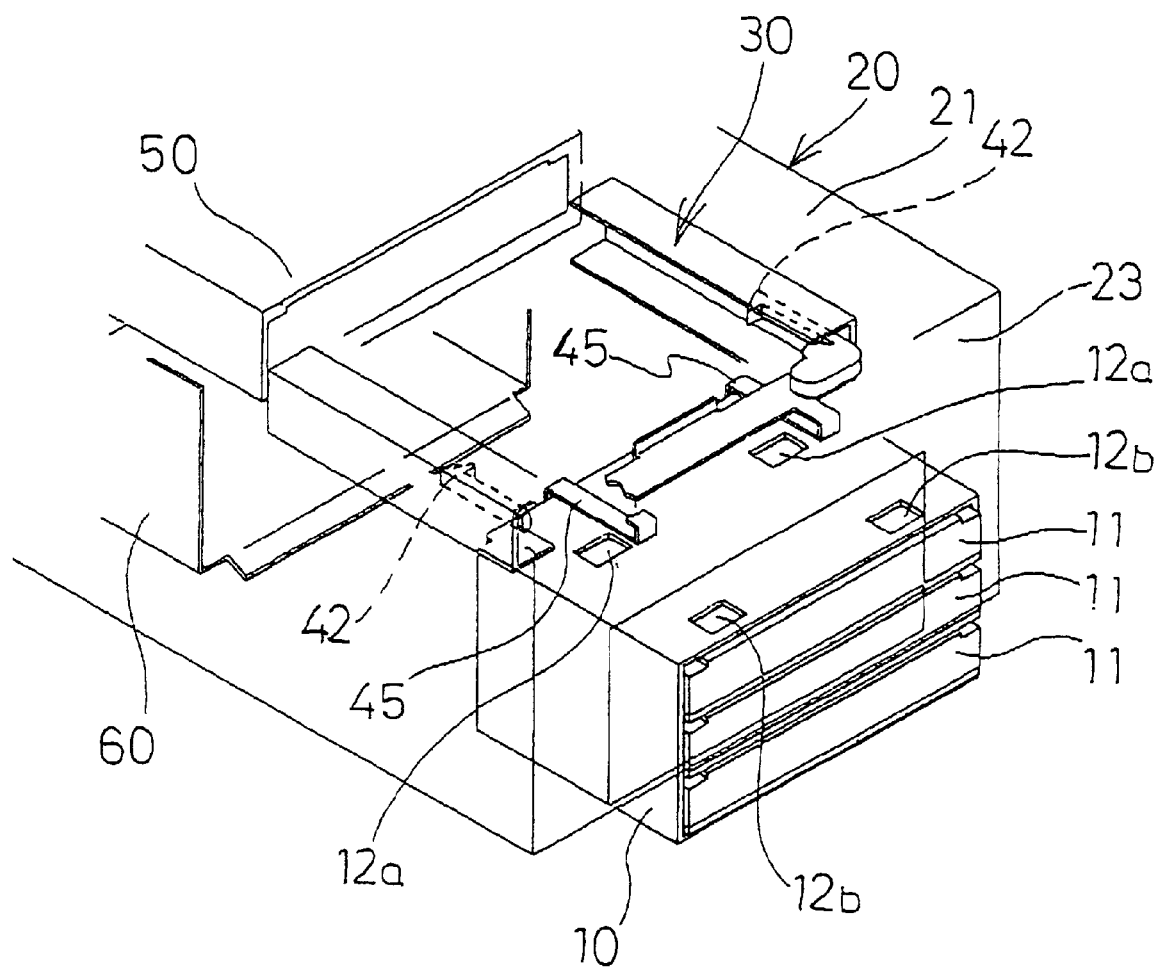
FIG. 32 is a partly sectioned perspective view of the front portion of the library showing the library apparatus with omitting a part in order to explain operation upon ejecting the magazine from the library apparatus, which shows a condition where the magazine is ejected, at which the magazine can be gripped and withdrawn.

Then, by driving the hand device 40 to the loading and unloading HP by driving the hand driving motor 84 in reverse direction (step 3504), the magazine 10 can be withdrawn from the magazine holder 60 as shown in FIG. 30. Furthermore, the magazine 10 can only be withdrawn at halfway in the first forward operation of the hand device 40. Therefore, second withdrawing operation is performed. Namely, by driving the shaft driving motor 35 and the hand driving motor 84 in reverse direction, respectively, the picker device 32 is placed at the transportation HP and the hand device 40 is placed in the loading and unloading HP (step 3505).

Next, the hand driving motor 84 is driven in forward direction, the hand device 40 is retracted to the rearmost position (step 3506). Also, the shaft driving motor 35 is driven in forward direction, the picker device 32 is lowered (step 3507. By lowering the picker device 32, the hooking claw portion 45 can engage with the back surface of the magazine 10. By driving the hand driving motor 84 in forward direction, the hand device 40 is driven frontwardly to the loading and unloading HP (step 3508). Then, the back surface of the magazine 10 is pushed by the hooking claw portion 45 to project the front portion of the magazine 10 from the insertion hole of the library apparatus 20 to complete ejecting operation of the magazine 10 (step 3510).

Then, by stopping actuation of the solenoid, the lid body 22 is permitted to be placed at the closed position for closing the insertion opening by the restoring force of the return spring 28. Thus, by withdrawing the magazine from the insertion opening, the lid body 22 is placed at the closed position.

As set forth above, the cartridge loading and unloading means for withdrawing desired one cartridge from the magazine, can perform loading and unloading of the magazine to the apparatus body. Accordingly, number of motors to be provided in the library apparatus can be reduced. Thus, number of parts can be reduced according to reduction of number of motors. Thus, construction can be simplified.

The cartridge loading and unloading means transports the magazine inserted through a magazine insertion opening of the apparatus body to the magazine holder, and then grips and withdraws a desired one of cartridges from the loaded magazine. Therefore, loading operation of the magazine and withdrawing of the cartridge can be performed sequentially.

The cartridge loading and unloading means transports the magazine inserted through the magazine insertion opening by repeating operation for a plurality of times. Therefore, even when the stroke for inserting and withdrawing the cartridge to and from the magazine is too short for loading and unloading operation of the magazine, the magazine can be certainly loaded and unloaded.

The cartridge loading and unloading means is mounted on cartridge moving means which is moved up and down with mounting the cartridge loading and unloading means. The cartridge withdrawn from the magazine by the cartridge loading and unloading means can be stably loaded in the medium drive means.

The cartridge loading and unloading means is provided with latching portion and the magazine is provided with a latch receiving portion for releasably engaging with the latching portion, the latching portion and the latch receiving portion are engaged and released by up and down motion of the cartridge loading and unloading means by the cartridge moving means. Therefore, after withdrawing the cartridge from the magazine by the cartridge loading and unloading means, the magazine can be automatically separated from the cartridge loading and unloading means by operation of the cartridge moving means.

The magazine can be certainly positioned before setting in the magazine holder. Therefore, loading operation of the magazine can be assured.

The magazine positioning means is provided on a lid body closing the magazine insertion opening, the magazine can certainly be positioned at the predetermined position associating with opening of the lid body. Therefore, loading operation of the magazine can be assured.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

The embodiment has been discussed to perform loading or unloading operation of the magazine by loading and unloading operation of the hand device twice. However, it is also possible to perform loading and unloading operation of the hand device for one time or three times.

What is claimed is:

1. A library apparatus of a storage media for at least one of (a) reading and (b) writing information from and in a storage medium housed in a cartridge by withdrawing a desired one of a plurality of cartridges housed within a magazine which loaded in an apparatus body, by cartridge loading and unloading means and loading the withdrawn cartridge in medium drive means, comprising:

said cartridge loading and unloading means performs loading and unloading of said magazine to said apparatus body;

a magazine holder for receiving said magazine is provided within said apparatus body, and said cartridge loading and unloading means transports said magazine inserted through a magazine insertion opening of said apparatus body to said magazine holder, and then grips and withdraws a desired one of cartridges from the loaded magazine;

said cartridge loading and unloading means is mounted on cartridge moving means which is moved up and down with said cartridge loading and unloading means, wherein said cartridge loading and unloading means is provided with a latching portion and said magazine is provided with a latch receiving portion for releasably engaging said latching portion, said latching portion and said latch receiving portion are engaged and released by up and down motion of said cartridge loading and unloading means by said cartridge moving means.

2. A library apparatus as set forth in claim 1, wherein said cartridge loading and unloading means transports said magazine inserted through said magazine insertion opening by repeating for a plurality of times and gripping of and withdrawing of a desired one of cartridges from the loaded magazine.

3. A library apparatus of a storage media for at least one of (a) reading and (b) writing information from and in a storage medium housed in a cartridge by withdrawing a desired one of a plurality of cartridges housed within a magazine which is loaded in a an apparatus body, by cartridge loading and unloading means and loading the withdrawn cartridge in medium drive means, comprising:

said cartridge loading and unloading means performs loading and unloading of said magazine to said apparatus body;

a magazine holder for receiving said magazine is provided within said apparatus body, and said cartridge loading and unloading means transports said magazine inserted through a magazine insertion opening of said apparatus body to said magazine holder, and then grips and withdraws a desired one of cartridges from the loaded magazine;

magazine positioning means for positioning said magazine inserted through said magazine insertion opening at a predetermined position located away from said magazine holder, said cartridge loading and unloading means transports said magazine from said predetermined position to said magazine holder, wherein said magazine positioning means is provided on a lid body closing said magazine insertion opening and is responsive to pushing of said magazine through said magazine insertion opening to be placed at an open position, said magazine positioning means engages with said magazine in the condition where said lid body is opened, to position said magazine at said predetermined position, said magazine positioning means releases engagement with said magazine as shifted by driving means, said cartridge loading and unloading means transports said magazine into said magazine holder after releasing said magazine positioning means from said magazine.

* * * * *